US010749251B2

(12) United States Patent
Moore et al.

(10) Patent No.: US 10,749,251 B2
(45) Date of Patent: Aug. 18, 2020

(54) WEARABLE HEADS-UP DISPLAYS WITH ANTENNAS AND ANTENNAS FOR SAME

(71) Applicant: NORTH INC., Kitchener (CA)

(72) Inventors: Joshua Moore, Elora (CA); Kai Zhang, Waterloo (CA); George Shaker, Waterloo (CA)

(73) Assignee: North Inc., Kitchener, ON (CA)

( * ) Notice: Subject to any disclaimer, the term of this patent is extended or adjusted under 35 U.S.C. 154(b) by 42 days.

(21) Appl. No.: 16/231,332

(22) Filed: Dec. 21, 2018

(65) Prior Publication Data

US 2019/0198983 A1 Jun. 27, 2019

Related U.S. Application Data

(60) Provisional application No. 62/690,280, filed on Jun. 26, 2018, provisional application No. 62/609,607, filed on Dec. 22, 2017.

(51) Int. Cl.
| | |
|---|---|
| *H01Q 1/27* | (2006.01) |
| *G02C 11/00* | (2006.01) |
| *G02B 27/01* | (2006.01) |
| *G02C 3/00* | (2006.01) |
| *G02C 5/22* | (2006.01) |
| *H04B 7/04* | (2017.01) |
| *G02C 13/00* | (2006.01) |

(52) U.S. Cl.
CPC ............ *H01Q 1/273* (2013.01); *G02B 27/017* (2013.01); *G02B 27/0176* (2013.01); *G02C 3/003* (2013.01); *G02C 5/22* (2013.01); *G02C 11/10* (2013.01); *G02C 13/001* (2013.01); *H04B 7/04* (2013.01); *G02B 2027/0178* (2013.01)

(58) Field of Classification Search
CPC .. H01G 1/273; G02B 27/017; G02B 27/0176; G02B 2027/0178; G02C 3/003; G02C 5/22; G02C 11/10; G02C 13/001
See application file for complete search history.

(56) References Cited

U.S. PATENT DOCUMENTS

| | | |
|---|---|---|
| 2012/0206335 A1 | 8/2012 | Osterhout et al. |
| 2016/0078278 A1 | 3/2016 | Moore et al. |

*Primary Examiner* — Graham P Smith
(74) *Attorney, Agent, or Firm* — Thomas Mahon

(57) ABSTRACT

Systems, devices and methods for eyeglasses frames and eyeglasses frames assemblies for wearable electronic devices, and particularly systems, devices, and methods that employ an antenna in eyeglasses frames and eyeglasses frames assemblies for wearable heads-up displays, the systems, devices and methods including a pair of eyeglasses having a first arm housing a radio and an antenna, wherein the antenna has a principal axis and main lobe extending outward therefrom and a power source is coupled to the first arm or a second arm and electrically coupled to the radio via an electrically conductive path.

18 Claims, 15 Drawing Sheets

ND DISPLAYS WITH
WEARABLE HEADS-UP DISPLAYS WITH ANTENNAS AND ANTENNAS FOR SAME

TECHNICAL FIELD

The present systems, devices, and methods generally relate to eyeglasses frames and eyeglasses frames assemblies (i.e., eyewear) for wearable electronic devices, and particularly relate to systems, devices, and methods that employ an antenna in eyeglasses frames and eyeglasses frames assemblies for wearable heads-up displays.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date are bulky, to enable adequate display performance, and, as a result, appear very unnatural on a user's face compared to the sleeker and streamlined look of typical eyeglass and sunglass lenses. However, a traditional eyeglasses frame is problematic when correct alignment of optical components carried by the eyeglasses frame is a necessity for a high-quality display. Because traditional eyeglasses have hinges where the arms meet the rest of the frame, any optical components carried on the arms may move relative to the rest of the frame or to the eye of the user while being worn, resulting in loss of or distortion of the display. There is a need in the art for means to successfully integrate electronic components into smaller frames in order to achieve the inconspicuous form factor and fashion appeal expected of the eyeglass frame industry while still maintaining a high display quality.

Inter-Device Connectivity

Another important factor in the design of electronic devices, including wearable heads-up displays, is the integration of components that allow for communication between devices. Examples of systems that integrate such inter-device connectivity are smart phones, watches, and headphones with Bluetooth® radio antennas. However, the design form factor and location of an antenna within an electronic device is important because the location of the antenna relative to other components, both electronic and non-electronic, within the device impacts the functionality of the antenna. In some cases, interference from other components within the device significantly reduces the range, signal strength, and overall connectivity capabilities of the antenna, thus preventing the antenna from effectively connecting or communicating with other electronic devices. In many cases, a similar result occurs depending on the distance and orientation of the antenna relative to an external device with which the antenna is communicating. As such, there remains a need in the art for integrating radio antennas into a compact, aesthetically-pleasing form factor for a wearable heads-up display in order to maximize connectivity, range, and signal strength of the antenna, regardless of the position of an external device relative to the antenna over a given range.

BRIEF SUMMARY

A first exemplary implementation of an apparatus, for example a glasses form factor for a wearable heads-up display, may be summarized as including: a front eyeglass frame, including: a first rim, a second rim, and a bridge that physically couples the first rim and second rim; a first arm coupled to the first rim and having a first temple portion; a second arm coupled to the second rim and having a second temple portion; a printed circuit board; and a directional antenna carried by the printed circuit board, the directional antenna having a main lobe with a principal axis that extends outwardly from the printed circuit board, the printed circuit board and the directional antenna housed in the first temple portion of the first arm with the principal axis of the directional antenna directed outwardly therefrom.

The apparatus may further include: the directional antenna comprising a spiral antenna; the directional antenna comprising a spiral trace of an electrically conductive material carried by one surface of the printed circuit board; the directional antenna comprising a spiral trace of an electrically conductive material carried along two or more layers of the printed circuit board; the principal axis of the directional antenna extending outwardly from a front of the first temple portion into a field-of-vision defined by the front eyeglass frame; the printed circuit board having a major face, wherein the directional antenna is planar with the major face of the printed circuit board and the principal axis of the directional antenna extends perpendicularly with respect to the major face of the printed circuit board; and the printed circuit board oriented in the first temple portion with the principal axis of the directional antenna extending perpendicularly from a front end of the first temple portion.

The apparatus may further include: the first temple portion being a metal channel member; the principal axis of the directional antenna extending outwardly from a front end of the first temple portion, the front end of the first temple portion at least proximate a portion of the front eyeglass frame; the metal channel member having a U-shaped metal cross section and a non-metallic front end, and the principal axis of the directional antenna extending outwardly from the front end of the first temple portion; and a portion of the printed circuit board being thermally conductively coupled to the first temple portion.

In an implementation, the apparatus further includes: a thermally conductive adhesive that secures a major surface of the printed circuit board thermally conductively to the metal channel member; a radio housed in the first temple portion of the first arm and electrically coupled to the antenna; circuitry communicatively coupleable to a power source housed in the second temple portion of the second arm and in electrical communication with the radio by an electrically conductive path passing through the first rim, the second rim, and the bridge; the electrically conductive path passing internally through the first rim, the second rim, and the bridge; circuitry communicatively coupleable to a power source housed in the first temple portion of the first arm and in electrical communication with the radio by an electrically conductive path passing through a portion of the first temple portion of the first arm; a first lens mounted in the first rim, and a second lens mounted in the second rim; and the first arm including a first hinge between the first frame portion and the first temple portion and the second arm including a second hinge between the second frame portion and the second temple portion.

A wearable heads-up display ("WHUD") according to some of the teachings herein may be summarized as including a support structure that in use is worn on a head of a user and a display component carried by the support structure. The display component allows the user to view displayed content (i.e., on a transparent combiner) but which also permits the user to see their external environment.

In some cases a transparent combiner is positioned within a field of view of an eye of the user when the support structure is worn on the head of the user.

In some implementations the WHUD includes a laser projector carried by the support structure, the laser projector being is positioned and oriented to scan laser light over at least a first area of the transparent combiner. The support structure may have the shape and appearance of an eyeglasses frame and the transparent combiner may include an eyeglass lens.

Generally WHUD also includes a communication module for communication with other electronic devices. In some implementations, the communication module includes an antenna that is at least partially integrated with the support structure. In some implementations, one or more components of the antenna are integrated within one or more of the support arms of a pair of eyeglasses. In some implementations, one or more components of the antenna are integrated within a rim portion of a pair of eyeglasses, the rim portion supporting one or more eyeglass lenses.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
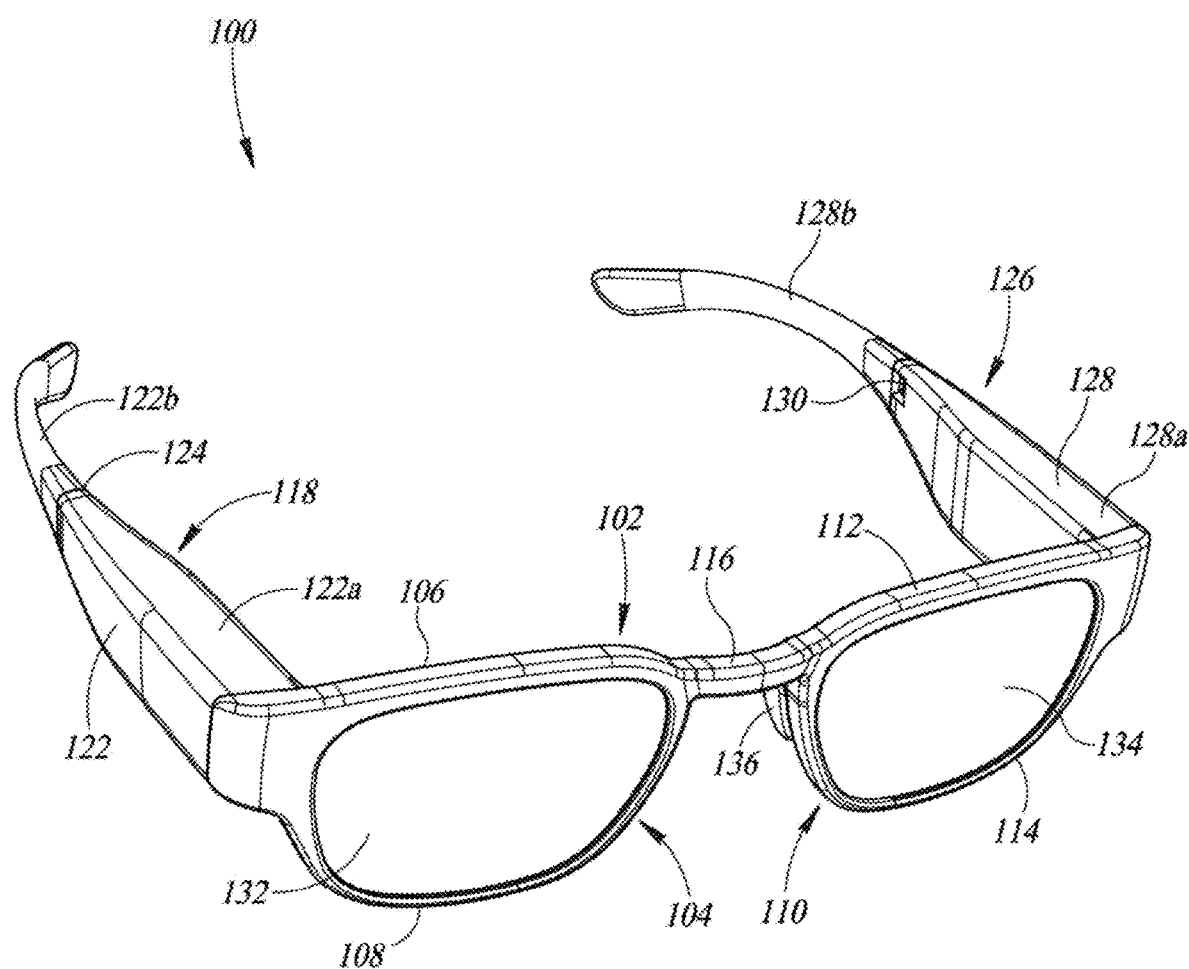
FIG. 1 is a perspective view of an exemplary implementation of a glasses frame formed according to the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with antennas, displays, portable electronic devices and head-worn devices have not been shown or described in detail to avoid unnecessarily obscuring descriptions of the implementations.

Unless the context requires otherwise, throughout the specification and claims which follow, the word "comprise" and variations thereof, such as "comprises" and "comprising," are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or embodiment. Thus, the appearances of the phrases "in one implementation" or "in an implementation" or to "in one embodiment" or "in an embodiment" in various places throughout this specification are not necessarily all referring to the same implementation or embodiment. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

The headings and Abstract of the Disclosure provided herein are for convenience only and do not interpret the scope or meaning of the embodiments.

The various implementations described herein provide systems, devices, and methods for eyeglasses frames and eyeglasses frames assemblies for wearable electronic devices, such as a wearable heads-up display, carrying an antenna for inter-device connectivity. Such glasses include a minimal form factor that is aesthetically pleasing and an antenna design that enables superior range, signal strength, and overall connectivity capabilities of the antenna.

FIG. 1 illustrates an exemplary implementation of eyewear in the form of a pair of eyeglasses 100 having a first arm 118, a second arm 126 and a front eyeglass frame 102 formed in accordance with the present disclosure. The front eyeglass frame 102 includes a first rim 104 having a first upper peripheral portion 106 and a first lower peripheral portion 108. The front eyeglass frame 102 further includes a second rim 110 having a second upper peripheral portion 112 and a second lower peripheral portion 114, and a bridge 116 securely physically coupling the first rim 104 and the second rim 110. In an implementation, the bridge 116 is coupled to the first rim 104 and the second rim 110 between the first upper peripheral portion 106 and the second upper peripheral portion 112. In addition, the front eyeglass frame 102 may be formed as a single, unitary, integral piece or as separate components fastened together with one or more adhesives, screws, or other fasteners.

Eyeglasses 100 also include the first arm 118 coupled to the first rim 104 and having a first temple portion 122. Temple portion 122 is preferably hollow in order to house certain components as described herein. In an implementation, first arm 118 is stiff and inflexible such that when first arm 118 is coupled to the front eyeglass frame 102, first arm 118 maintains a fixed position relative to the front eyeglass frame 102. In the illustrated implementation, there is no hinge connecting the arm 118 of the eyeglasses 100 to the front eyeglasses frame 102, in contrast to traditional eyeglasses, although one of skill in the art will appreciate that other implementations include such a hinge.

Further, in an implementation, the first temple portion 122 has a first hinge 124 which separates first temple portion 122 into a first anterior part 122a and a first posterior part 122b, wherein first posterior part 122b folds in towards the front eyeglasses frame 102. In other words, the first hinge 124 is coupled between the first anterior part 122a and the first posterior part 122b such that the first posterior part 122b is rotatable relative to the first anterior part 122a and the front eyeglass frame 102 about the first hinge 124 along at least one axis of rotation passing through the first hinge 124.

The pair of eyeglasses 100 includes a second arm 126 coupled to the second rim 110 having a second temple portion 128. Second temple portion 128 is hollow. In an implementation, second arm 126 is stiff and inflexible such that when second arm 126 is coupled to the front eyeglass frame 102, second arm 126 maintains a fixed position relative to the front eyeglass frame 102. There is no hinge connecting the second arm 126 of the eyeglasses 100 to the front eyeglasses frame 102, in contrast to traditional eyeglasses.

In an implementation, second temple portion 128 has a second hinge 130 which separates second temple portion 128 into a second anterior part 128a and a second posterior part 128b, wherein second posterior part 128b folds in towards the front eyeglasses frame 102. In other words, the second hinge 130 is coupled between the second anterior part 128a and the second posterior part 128b such that the second posterior part 128b is rotatable relative to the second anterior part 128a and the front eyeglass frame 102 about the second hinge 130 along at least one axis of rotation passing through the second hinge 130.

Temple portions 122 and 128 each preferably sit on, and extend beyond, a respective ear of a user to hold eyeglasses 100 on a head of the user. The front eyeglass frame 102 further includes a first lens 132 mounted in the first rim 104 and a second lens 134 mounted in the second rim 110. As such, front eyeglass frame 102 has the shape and appearance of a front of a traditional pair of eyeglasses. Lenses 132 and 134 may be inserted and held in respective rims 104 and 110 by an interference fit, friction fit, press fit, or by a heat/shrink fit. Each of rims 104 and 110 is of a size and shape that can receive the respective lens 132 and 134 and hold the lenses 132 and 134 in place without any movement once the lenses 132 and 134 are inserted. Assembly of the eyeglasses 100 may include the technology described in U.S. Provisional Patent Application Ser. No. 62/609,607 and U.S. Provisional Patent Application Ser. No. 62/634,654.

In an implementation, eyeglasses 100 are a wearable heads-up display wherein display-producing components are present within or carried by one or both arms 118 and 126 (i.e., one arm for a monocular display, both arms for a binocular display) and display components are embedded within or carried by one or both lenses 132 and 134. In addition, as described in more detail below, the eyeglasses 100 may include an antenna (not shown) and a power source (not shown) in addition to power circuitry (e.g., processor, radio (e.g., transmitter, receiver or transceiver coupled to one or more antenna)) in order to provide inter-device connectivity between the glasses 100 and external electronic devices, such as a smart phone (not shown) or a ring worn on the user's finger that implements the technology described in U.S. Provisional Patent Application Ser. No. 62/236,060, U.S. Non-Provisional patent application Ser. No. 15/282,535 (now US Patent Application Publication 2017/0097753), and U.S. Non-Provisional patent application Ser. No. 15/799,642 (now US Patent Application Publication 2018/0067621).

In an implementation, the arms 118 and 126 carry certain display-producing components, for example one or more of a projector (e.g., a scanning laser projector with laser diodes), or a micro-display (e.g., liquid crystal display (LCD) or organic light emitting diode (OLED) display). The display components embedded in the lenses 132 and 134 may be a waveguide which receives light from the display-producing components and guides the light towards an eye of the user, or may be a reflector, refractor, or diffractor; for example, a holographic optical element, to for example provide an augmented reality experience. The fixed position of at least the anterior portions 122a and 128a of the arms 118 and 126 relative to the front eyeglasses frame 102 may enable correct initial and "in-use" positioning of components such as the projector and holographic optical element, in implementations where such components are used.

Such "in-use" positioning may be further enabled by a wire (not shown) in at least one of, or preferably both of, the first arm 118 and the second arm 126, wherein the wire is repeatedly plastically deformable to retain a portion of the first arm 118 or second arm 126 in a shape provided by the user. Preferably, the wire (not shown) is housed at least in the first posterior portion 122b and the second posterior portion 128b, wherein the portions 122b and 128b are similarly formed of an elastic material, such that the wire (not shown) can be used to adjust the glasses 100 to the head of the user. The wire (not shown) preferably comprises a plastically deformable metal, such as stainless steel, titanium, beta titanium (i.e., titanium alloy including vanadium and aluminum), a titanium nickel alloy, beryllium, or a nickel and copper alloy, or various combinations thereof, among others. Further, the eyeglasses 100 may include adjustable nose pads, such as nose pad 136, to further enable customization of the fit of eyeglasses 100 to the user. In some instances, the structure may be warmed before or as part of shaping the first and second arms 118, 126.

The eyeglasses 100 preferably include two nose pads 136, wherein each nose pad 136 is coupled to a respective rim 104, 110, and the nose pads 136 are adjustable in orientation and height. Accordingly, the nose pads 136 enable lenses 132, 134 to be adjusted relative to the user's eye (i.e., adjusting the nose pads 136 adjusts a height of the lenses 132, 134 relative to the eyes of a user), which one of skill in the art will appreciate is an important design consideration for wearable heads-up displays including display components. Adjusting the angular orientation of the nose pads 136 enables a secure fit on the user's nose to further prevent the glasses 100 from falling off of a user's face. In an implementation, nose pads 136 are also adjustable horizontally so as to further assist in adjusting the eyeglasses 100 and enabling a secure fit on the nose of the user.

Figure 2:
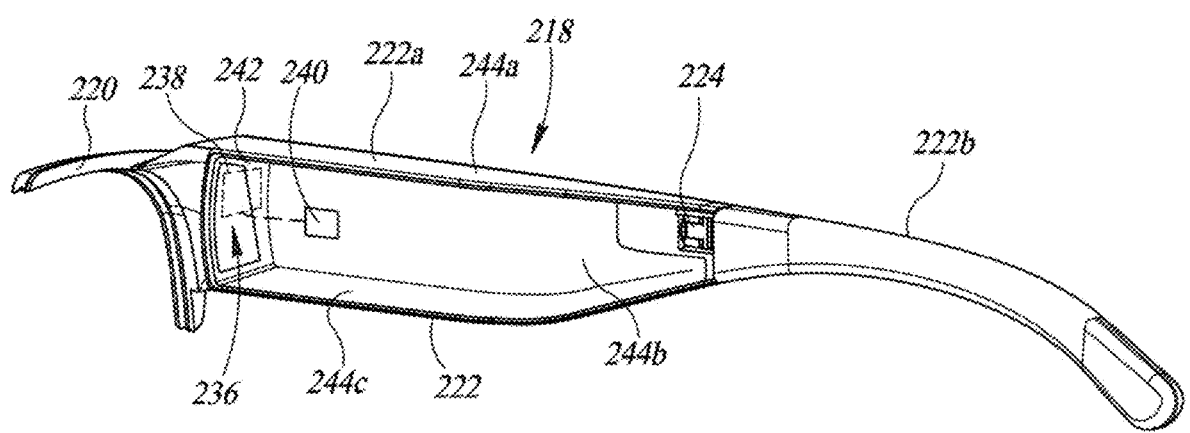
FIG. 2 is a perspective view of an exemplary implementation of a first arm of a glasses frame according to the present disclosure having an antenna housed in the first arm.

Referring now to FIG. 2 with continuing reference to FIG. 1, illustrated therein is a perspective view of an exemplary implementation of a first arm 218 of a pair of eyewear, such as eyeglasses 100. One of skill in the art will appreciate that the first arm 218 can be substantially similar to first arm 118 or second arm 126 in FIG. 1. Accordingly, the features described with reference to first arm 218 may be incorporated into implementations of first arm 118 or second arm 126, or both, in eyeglasses 100, as well as in other implementations disclosed herein.

First arm 218 includes a first frame portion 220 and a first temple portion 222. Temple portion 222 is preferably hollow to receive components for a wearable heads-up display within the eyewear, for example eyeglasses 100, as described herein. The temple portion 222 preferably has a first aperture 236 at a front thereof, which may also assist with placing the components, or alternatively, may receive an antenna as described below. First frame portion 220 is preferably stiff and inflexible such that when first frame portion 220 is coupled to the front eyeglass frame 102, first arm 218 maintains a fixed position relative to the front eyeglass frame 102. First frame portion 220 and first temple portion 222 may be formed as a single, unitary, integral component, or may be two components which are combined to make first arm 218. In the implementation illustrated in FIG. 2, first frame portion 220 is attached to first temple portion 222 with screws, but one of skill in the art will appreciate that other fasteners may be used (e.g., bolts, rivets, adhesive, epoxy, etc.).

First arm 218 further includes a first hinge 224, which separates the first temple portion 222 into a first anterior part 222a and a first posterior part 222b. The first hinge 224 is preferably one of a barrel hinge or a spring hinge. However, in some implementations, the first arm 218 does not include the first hinge 224, in which case the anterior and poster parts 222a and 222b are simply anterior and posterior portions of the temple portion 222. Further, the first anterior part 222a of the first temple portion 222 of the first arm 218 includes a front end 242 proximate the first frame portion 220. In an assembled eyeglass frame, such as eyeglasses 100, 300 described herein, the front end 242 is also proximate the front eyeglass frame (not shown), which may be substantially similar to front eyeglass frame 102, 302 in FIGS. 1 and 3, respectively. In an implementation, the first aperture 236 is formed in the front end 242.

In FIG. 2, a radio 240 is housed within the first arm 218, and preferably within the first temple portion 222, and even more preferably within the first anterior part 222a of the first temple portion 222. In some implementations, the radio 240 may be coupled to a printed circuit board (not shown) housed in the first temple portion 222, in which case, the radio 240 is in electrical communication with electrically conductive traces of the printed circuit board (not shown). In an implementation, the radio 240 can take the form of a transmitter and, or, a receiver or a transceiver. An antenna, represented by dashed lines 238, is electrically coupled to and in electrical communication with the radio 240. The radio 240 and antenna(s) 238 are operable to provide wireless communications in the radio frequency and, or, microwave frequency bands of the electromagnetic spectrum.

In an implementation, the antenna 238 extends from the radio 240 to terminate in, or proximate to, the first aperture 236. In an implementation where the antenna 238 terminates in the first aperture 236, the antenna 238 occupies a portion of, or substantially all of, the first aperture 236 and may have a substantially rectangular shape, although other geometric shapes are possible. For example, antenna 238 may be a circle, a square, an oval, a triangle, a trapezoid, a pentagon, a hexagon, or an octagon, among others. Further, the antenna 238 may be a directional antenna, for example a spiral antenna or a spiral trace of electrically conductive material carried along one or more layers of a printed circuit board, as described in further detail herein. In such implementations, where the antenna 238 is a directional antenna, the orientation of the directional antenna 238 will correspond to a direction in which a principal axis and main lobe of the antenna 238 extend. Implementations of the present disclosure include the antenna 238 oriented such that the principal axis and main lobe of the antenna 238 extend in any direction in a horizontal or vertical plane. In other words, the principal axis and main lobe may be any value between 0 to 360 degrees in both the vertical and horizontal planes, depending on the orientation of the directional antenna 238.

In still further implementations, the first anterior part 222a of the first arm 218 includes a U-shaped cross section along at least a portion of its length, wherein the first anterior part 222a comprises a metal. In other words, the first anterior part 222a is a channel including sidewalls 244a, 244b, and 244c such that the cross section of the channel is generally in the shape of a "U," wherein at least one of the sidewalls 244a, 244b, and 244c, or more preferably, all of the sidewalls 244a, 244b, and 244c comprise metal along at least a portion of the length of the sidewalls 244a, 244b, and 244c. The sidewalls 244a, 244b, and 244c may also optionally include a metal portion for heat dissipation surrounded by plastic or non-metallic portions in the remainder of the first anterior part 222a. As such, in an implementation, the U-shaped cross section is metal. In other implementations, only a portion of the first anterior part 222a is metal (i.e., one of the sidewalls 244a, 244b, 244c is metal and the remaining sidewalls are plastic or a non-metallic material), while in further implementations, the entire U-shaped cross section is plastic or other non-metallic material. Because the antenna 238 may be a directional antenna configured to direct a main lobe of the antenna 238 out of the aperture 236, as described herein, the front end 242 may be plastic, or other non-metallic material, to aid in reducing inference between the antenna 238 and the front end 242. However, implementations of the present disclosure include the front end 242 being metal as well, with the antenna 238, and other features of the implementations of the present disclosure designed to reduce interference.

In implementations where at least a portion of the first anterior part 222a comprises metal or a material with high thermal conductivity, the antenna 238 may be coupled to the first anterior part 222a with a thermally conductive adhesive. In other words, it is preferable that the coupling between the antenna 238 and the first anterior part 222a enable heat transfer between the antenna 238, and other electric components that may be present in the first anterior part 222a, to the sidewalls 244a, 244b, and 244c of the first anterior part 222a. One of skill in the art will recognize that, because the sidewalls 244a, 244b, and 244c of the first anterior part 222a have a comparatively large surface area (i.e., relative to individual electronic components) that is exposed to the external environment, the metal of the sidewalls 244a, 244b, and 244c of the first anterior part 222a dissipate heat produced by functioning of the electronic components which may be present within the first anterior part 222a in an effective manner. As such, it is preferable that the adhesive, fasteners, or other securing means used to couple the antenna 238, radio 240, and other components to the first anterior part 222a allow for heat transfer. Examples of adhesives that enable such heat transfer include, but are not limited to, epoxies, glues or polymers entrained with various proportions of metals.

Figure 3:
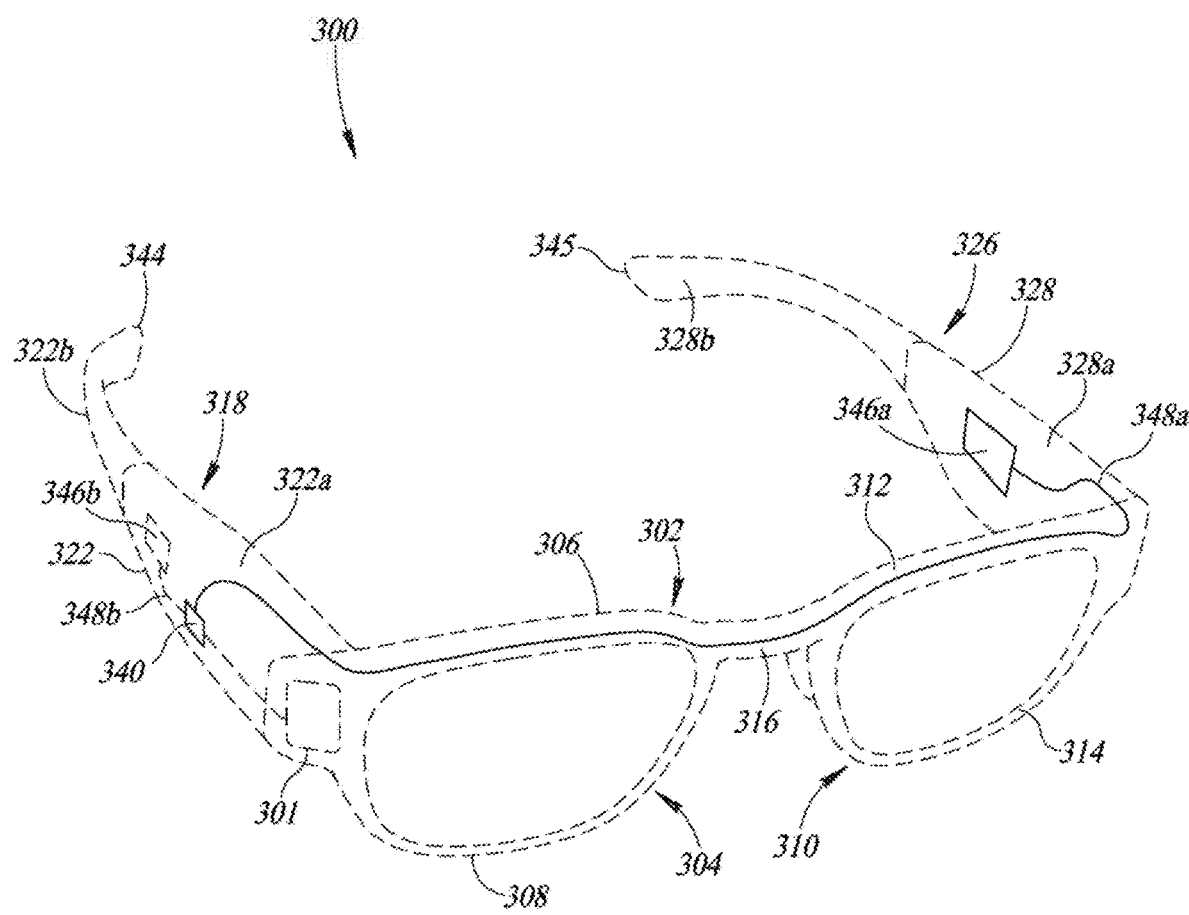
FIG. 3 is a perspective view of an alternative exemplary implementation of a glasses frame formed according to the present disclosure and having an electrically conductive path housed in the frame.

In addition, implementations of the present disclosure include an antenna, a power source, and an electrically conductive path or wire placed in various locations within an eyewear frame. For example, FIG. 3 is a perspective view of an exemplary implementation of eyeglasses 300, which may be, in an implementation, substantially similar in structure to eyeglasses 100, having an antenna 301 incorporated in the eyeglasses 300. For ease of recognition in the drawings, eyeglasses 300 are represented by dashed lines, and certain internal features, such as the frame portions and apertures of arms 318, 326, are not shown, although one of skill in the art will appreciate that such features are present within implementations of the eyeglasses 300.

The eyeglasses 300 include first and second arms 318 and 326 coupled to a front eyeglass frame 302. The front eyeglass frame 302 includes a first rim 304 and a second rim 310 securely physically coupled by a bridge 316. A radio 340 is housed internally in a first temple portion 322 of the first arm 318, and preferably within a first anterior portion 322a of the first temple portion 322 of the first arm 318. The radio 340 is electrically coupled to, or in electrical communication with, the antenna 301, which is preferably housed within the first temple portion 322 of the first arm 318, and more preferably within the first anterior portion 322a of the first temple portion 322, and more preferably toward a front end (not shown) of the first temple portion 322 of the first arm 318. In an implementation, the antenna 301 is housed at least partially in an aperture (not shown) similar to aperture 236 (FIG. 2) at the front end (not shown) of the first anterior portion 322a.

FIG. 3 further illustrates a power source 346a. In a preferred implementation, the power source 346a is housed internally within a second temple portion 328 of the second arm 326, and more preferably within a second anterior portion 328a of the second temple portion 328 of the second arm 326. The power source 346a may be a portable power source, such as a battery or a supercapacitor (i.e., capacitor with capacitance on the order of 0.01F or greater). In addition, where the power source 346a is a battery, the battery can be rechargeable (i.e., a user inserts an external charging cord into glasses 300 to charge the battery comprising the power source 346a), or replaceable (i.e., the glasses 300 include a removable cover for removing and replacing the battery or batteries comprising the power source 346a). In implementations where the power source 346a is one or more replaceable batteries, circuitry may be housed within either of the arms 318 and 326, and more specifically within either of the first and second temple portions 322 and 328, to receive the battery or batteries and provide an electrical connection between the battery or batteries and the radio 340. In other words, the circuitry is communicatively coupleable to the replaceable battery or batteries comprising the power source 346a. However one of skill in the art will appreciate that, in implementations where the power source 346a is a rechargeable battery or a supercapacitor, the same or substantially similar circuitry may be present to connect the power source 346a to the radio 340. The power source 346a is electrically coupled to the radio 340 by wire 348a to transmit electric current from the power source 346a to power the radio 340, as well as any other electronic components housed within the first temple portion 322 of the first arm 318.

In an implementation, the wire 348a passes internally from the power source 346a housed within the second temple portion 328, through a second aperture (not shown) in the second arm 326 similar to first aperture 236 (FIG. 2), the second rim 310, the bridge 316, the first rim 304, the first aperture (not shown) to the radio 340 in the first temple portion 322. The wire 348a can pass through any of the elements of the front eyeglass frame 302. For example, in various implementations the wire 348a passes internally through a second upper peripheral portion 312 of the second rim 310, the bridge 316, and a first upper peripheral portion 306 of the first rim 304. In other implementations, the wire 348a passes through a second lower peripheral portion 314 of the second rim 310, the bridge 316, and the first upper peripheral portion 306 of the first rim 304. In alternative implementations, the wire 348a passes through the second upper peripheral portion 312, the bridge 316, and a first lower peripheral portion 308 of the first rim 304. Accordingly, implementations of the present disclosure are not limited by the path of the wire 348a through the front eyeglass frame 302.

In other variations, the power source and wire are located within the first temple portion 318 along with the radio 340, as represented by dashed lines 346b and 348b, respectively. In such an implementation, the wire 348b preferably does not pass through any portion of the front eyeglass frame 302. Rather, the power source 346b is housed proximate the radio 340 and electrically coupled to radio 340 by wire 348b. It may even be possible to include the power source 346b within a first posterior portion 322b of the first temple portion 322 or a second posterior portion 328b of the second temple portion 328. In other words, in an implementation, the power source 346b is located within the first anterior portion 322b proximate a first distal end 344 of the first arm 318 or within the second anterior portion 328b of the second temple portion 328 proximate a second distal end 345 of the second arm 326.

In an implementation, the antenna 301 is electrically coupled to the radio 340 and operative to wirelessly transmit radio frequency signals that embody an established wireless communication protocol, for example, without limitation: Bluetooth®, Bluetooth® Low-Energy, Bluetooth Smart®, ZigBee®, WiFi®, Near-Field Communication (NFC), or the like. Such protocols typically employ radio frequency signals in the range of 1 GHz to 10 GHz (with the exception of NFC, which operates in the 10 MHz-20 MHz range) and may include pairing or otherwise establishing a wireless communicative link between an apparatus, such as a wearable heads-up display carrying the antenna 301, and another external electronic device.

Figure 4:
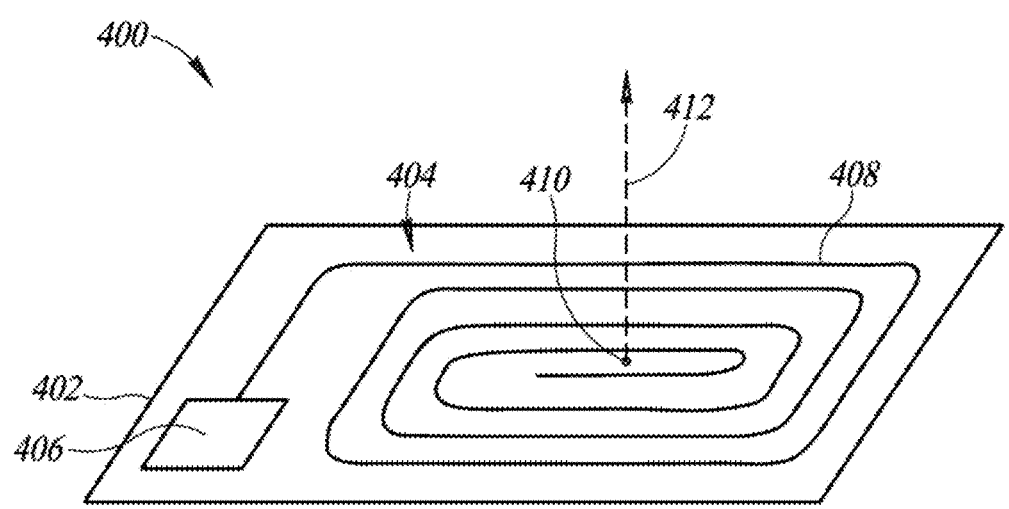
FIG. 4 is a perspective view of an exemplary implementation of a printed circuit board formed according to the present disclosure and having a single layer, wherein a directional antenna is carried on the layer.

FIG. 4 is an exploded view of a printed circuit board 400. In an implementation, the printed circuit board 400 comprises a single layer bounded by outermost edge 402 and having a first surface 404. However, implementations of the present disclosure include printed circuit boards with additional layers, as described herein. In the illustrated implementation, first surface 404 is flat and planar. A radio 406 is carried by the first surface 404 of the printed circuit board 400, although one of skill in the art will appreciate that the radio may be located external to the printed circuit board 400, such as in FIG. 3. The radio 406 is in electrical communication with electrically conductive traces (not shown) in the printed circuit board 400. In various implementations, the radio 406 can take the form of a transmitter and, or, a receiver or a transceiver.

The radio 406 is electrically coupled to an antenna 408 carried on the first surface 404 of the printed circuit board 400. The radio 406 and the antenna 408 are operable to provide wireless communications in the radio frequency and, or, microwave frequency bands of the electromagnetic spectrum. One of skill in the art will also appreciate that a length of the antenna 408 preferably corresponds to an integer multiple of a wavelength of a signal to be received or transmitted by the antenna 408. For example, in various implementations, a length of the antenna 408 is ¼, ⅓, or ½ of the wavelength of the wireless signals to be communicated via the antenna 408.

As shown in FIG. 4, the antenna 408 can take the form of a spiral antenna, wherein the antenna 408 winds in a continuous and gradually tightening manner on the first surface 404. Importantly, the spiral antenna winds about a central point 410, such that the antenna 408 is a directional antenna. With a directional antenna, the objective is to direct radio waves received or transmitted by the antenna in one particular direction. The spiral pattern of the antenna 408 increases gain (i.e., amount of increase in energy that an antenna adds to a radio frequency signal) in one direction. However, as the gain of a directional antenna increases, the angle of radiation typically decreases. As such, directional antennas, such as antenna 408, enable a greater coverage distance but typically with a reduced coverage angle.

Moreover, while antenna 408 is illustrated in a rectangular pattern with rounded edges, implementations of the antenna 408 include various configurations that retain directionality. For example, the antenna 408 can have a circular pattern, a triangular pattern, a square pattern, a hexagonal pattern, an octagonal pattern, a trapezoidal pattern, or an ovular pattern, among others. Each of these respective patterns may include rounded or sharp edges. Further, the antenna 408 is illustrated in FIG. 4 as having four layers. In the context of antenna 408 only, "layers" refers to how many times the antenna 408 wraps around the central point 410 as determined by how many times the antenna 408 intersects a line from the central point 410 to the outermost edge 402. In other words, starting at central point 410 and moving outwards toward outermost edge 402, the antenna 408 wraps around the central point 410 four times (i.e. intersects with a line from the central point 410 to outermost edge 402 four times) in the illustrated implementation and thus antenna 408 includes four layers. However, implementations of the present disclosure include the antenna 408 having more or less than four layers. For example, in various implementations of the present disclosure, the antenna 408 includes a single layer, two layers, three layers, four layers, five layers, six layers, seven layers, eight layers, nine layers, ten layers, or more. The antenna 408 may even include more than ten layers, more than 20 twenty layers, or more than 30 layers, or any number of layers therebetween. Implementations of the antenna 408 with a larger number of layers will generally be understood to have greater directionality than antennas with a less number of layers (i.e. antennas with more layers have higher gain than antennas with less layers). As such, the pattern and number of layers included in antenna 408 enables customization of the directionality of the antenna 408.

One of skill in the art will appreciate that antennas are typically compared using radiation patterns in horizontal or vertical axes, which measure the directional dependence of the strength of the radio waves from the antenna wherein radial distance from the center represents signal strength. The radiation patterns typically have a curved shape known in the art as "lobes," which are separated by "nulls" where the radiation falls to zero. On a given radiation pattern for an antenna, the lobe with the greatest length, or greatest distance from the center of the pattern, corresponds to the direction with the highest signal strength, which is called the main lobe, or main beam. The other lobes are called "sidelobes" or "minor lobes." Further, the "beamwidth" of the antenna is the width of the main lobe, usually specified by the half power beamwidth, which is the angle encompassed between the points on the side of the lobe where the power has fallen to half of its maximum value. The beamwidth corresponds to the coverage angle in the direction of the main lobe. Thus, the axis of maximum radiation, passing through a center of the main lobe, is called the "beam axis" or "boresight axis" or "principal axis." In some types of antennas, such as in split-beam antennas, there may exist more than one major lobe.

With reference to FIG. 3 and FIG. 4, the pattern of the antenna 408 about the central point 410 creates a beam axis or principal axis, represented by dashed arrow 412, passing through the central point 410 and extending perpendicularly from the first surface 404 of the printed circuit board 400. Put another way, the design of the antenna 408 creates a main lobe centered at the central point 410 and extending substantially perpendicularly outward from the first surface 404. In certain implementations, the printed circuit board 400, the radio 406, and the antenna 408 are incorporated into an eyeglass frame, such as eyeglasses 300, in place of antenna 301 and radio 340. In such implementations, the directionality of the antenna 408 directs the main lobe and principal axis 412 perpendicularly outward from the antenna 408, which is preferably located toward the front of the first anterior portion 322a of the first temple portion 322 of the first arm 318. In such implementations, the main lobe extends into a field-of-vision of the user through at least the first rim 304. Further, the radio 406 is electrically coupled to the power source 346a or 346b to enable the transmission or receipt of signals by the radio 406 through the antenna 408.

Further, it is to be understood that for the efficient transfer of energy between the radio 406 and the antenna 408, the impedance of the radio 406 and the antenna 408 are preferably substantially similar (i.e., within 3 ohms), or more preferably, substantially the same (i.e., within 0.5 ohms). In certain implementations of the antenna 408, the antenna 408 includes circuitry as part of the antenna that matches the impedance of the antenna 408 to that of the radio 406, while in other implementations, such circuitry is located on, or carried by, the printed circuit board 400. It is to be further appreciated that the antenna 408 can be a spiral trace carried by the first surface 404 of the printed circuit board 400. Alternatively, the antenna 408 can be a stamped wire on the printed circuit board 400.

Figure 5:
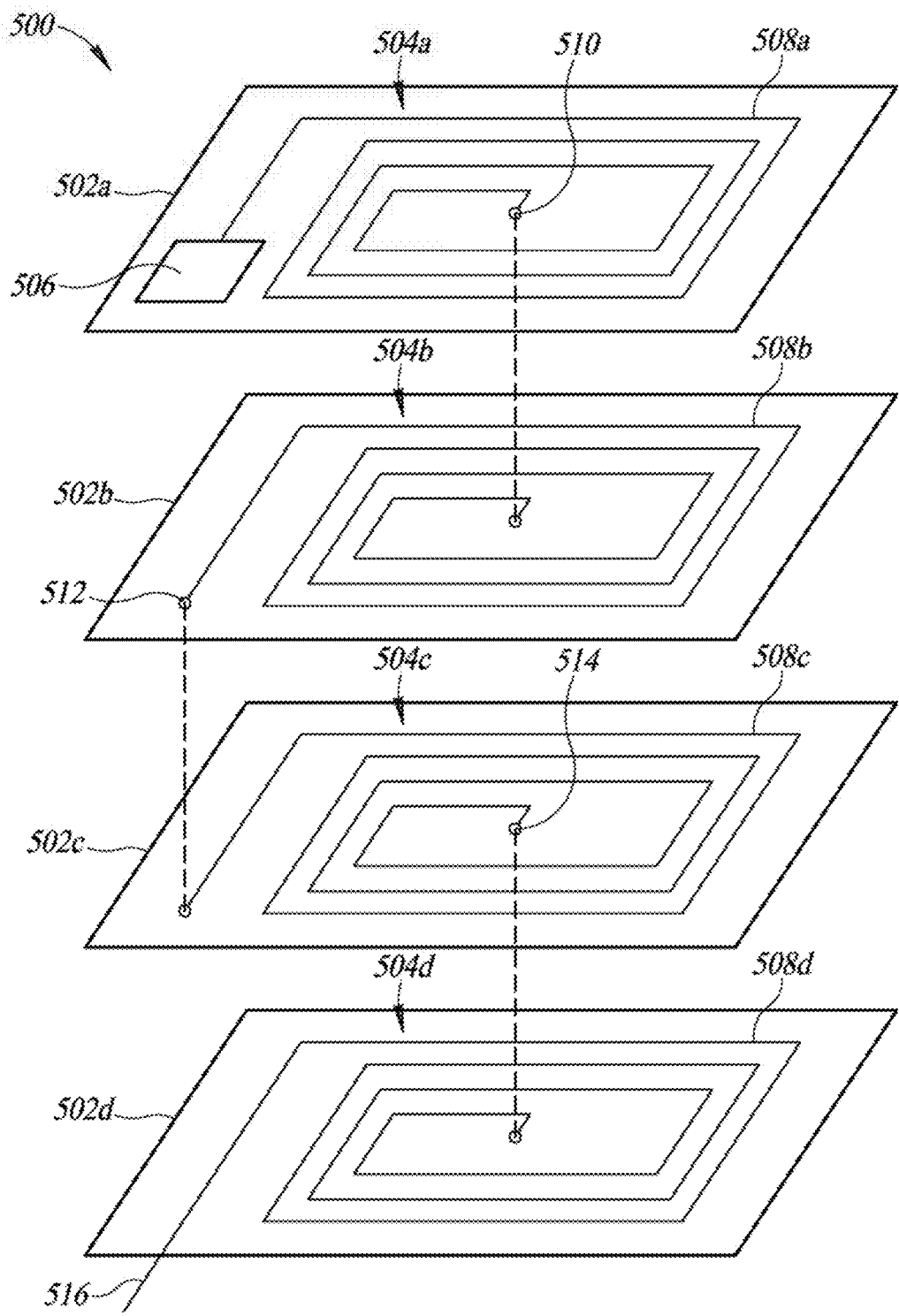
FIG. 5 is an exploded view of an alternative exemplary implementation of a printed circuit board formed according to the present disclosure and having multiple layers, wherein a directional antenna is carried on one or more of the layers with one or more vias electrically connecting the layers.

FIG. 5 is an exploded view of an alternative exemplary implementation of a printed circuit board 500. The printed circuit board 500 includes at least a first layer 502a, a second layer 502b, a third layer 502c and a fourth layer 502d, and potentially additional layers. For example, implementations of the present disclosure include the printed circuit board 500 having five layers, six layers, seven layers, eight layers, nine layers, ten layers, or more than ten layers. Each of the layers 502a, 502b, 502c, and 502d includes a respective major face 504a, 504b, 504c, and 504d. In an implementation, each of the major faces 504a, 504b, 504c, and 504d are flat and planar. A radio 506 is carried by the first major face 504a of the first layer 502a of the printed circuit board 500, although one of skill in the art will appreciate that the radio 506 may be located external to the printed circuit board 500, such as in FIG. 3. The radio 506 is in electrical communication with electrically conductive traces (not shown) in the first layer 502a of the printed circuit board 500. In various implementations, the radio 506 can take the form of a transmitter and, or, a receiver or a transceiver.

The radio 506 is electrically coupled to an antenna comprised of first through fourth antenna portions 508a, 508b, 508c, and 508d carried on the first major face 504a of the first layer 502a, the second major face 504b of the second layer 502b, the third major face 504c of the third layer 502c, and the fourth major face 504d of the fourth layer 502d of the printed circuit board 500, respectively. Each of the antenna portions 508a, 508b, 508c, and 508d preferably has a substantially similar, or more preferably substantially identical, pattern and length and are electrically conductively connected by vias 510, 512, and 514 to form the antenna. While FIG. 5 shows first via 510 electrically connecting antenna portions 508a and 508b, second via 512 electrically connecting antenna portions 508b and 508c, and third via 514 electrically connecting antenna portions 508c and 508d, one of skill in the art will appreciate that the pattern and number of vias on the layers 502a, 502b, 502c, and 502d may differ from that illustrated.

However, because the vias 510, 512, and 514 connect the antenna portions 508a, 508b, 508c, and 508d, each of the antenna portions 508a, 508b, 508c, and 508d are operative to increase the directionality associated with receipt and transmission of signals as compared to a single antenna on a single layer (for example antenna 508a). In other words, the antenna portions 508a, 508b, 508c, and 508d are antenna elements lying in an X-Y plane of each respective layer 502a, 502b, 502c, and 502d that are electrically coupled in series to form a single antenna that extends along a Z-axis direction, which may enhance directionality. Each of the antenna portions 508a, 508b, 508c, and 508d can be stamped wires or separate electrically conductive traces laid in the respective X-Y planes of each layer 502a, 502b, 502c, and 502d.

In other words, the antenna portions 508a, 508b, 508c, and 508d each have a principal axis that is substantially aligned and passing through vias 510 and 514, which are located centrally with respect to the antenna portions 508a, 508b, 508c, and 508d. As such, the main lobe of each antenna portion 508a, 508b, 508c, and 508d extends along the respective aligned principal axes perpendicularly outward from each respective major face 504a, 504b, 504c, and 504d. The fourth layer 502d, which may be a top or bottom layer in various implementations, may include an end portion 516, which may be electrically coupled to the radio 506, a ground (not shown), or other electrical components.

The radio 506 and the antenna portions 508a, 508b, 508c, and 508d are operable to provide wireless communications in the radio frequency and, or, microwave frequency bands of the electromagnetic spectrum. One of skill in the art will also appreciate that a length of each antenna portion 508a, 508b, 508c, and 508d preferably corresponds to an integer multiple of a wavelength of a signal to be received or transmitted by the antenna portions 508a, 508b, 508c, and 508d. For example, in various implementations, a length of each antenna portion 508a, 508b, 508c, and 508d is ¼, ⅓, or ½ of the wavelength of the wireless signals to be communicated via the antenna portions 508a, 508b, 508c, and 508d.

Alternatively, implementations of the present disclosure include the first antenna portion 508a electrically coupled to the radio 506 and operative as an active radiating element, as described herein. Instead of being electrically conductively coupled by the vias 510, 512, 514, each of the second, third, and fourth antenna portions 502b, 502c, 502d can be inductively coupled to the active antenna 508a as passive antenna radiating elements spaced along the Z-axis. In such a configuration, each of the antenna portions 508a, 508b, 508c, 508d combine to comprise a Yagi antenna. Further, each of the antenna portions 508a, 508b, 508c, 508d may incorporate one or more features of the antenna 408 described with reference to FIG. 4. In an implementation, each of the antenna portions 508a, 508b, 508c, 508d is substantially similar to antenna 408 or implementations thereof, except for the differences described herein.

Figure 6A:
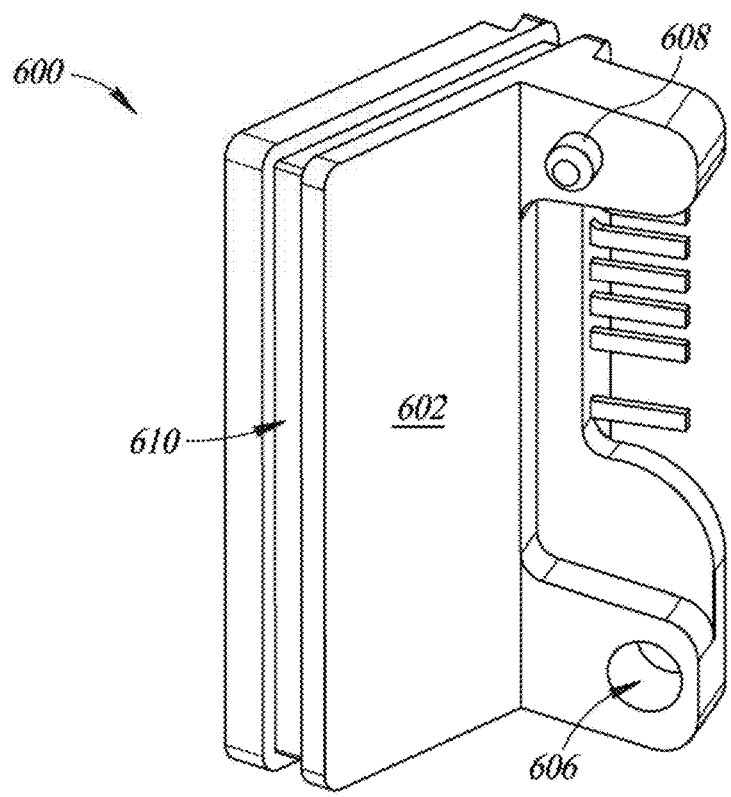
FIG. 6A is a perspective view of an exemplary implementation of a device formed according to the present disclosure for carrying an antenna.
Figure 6B:
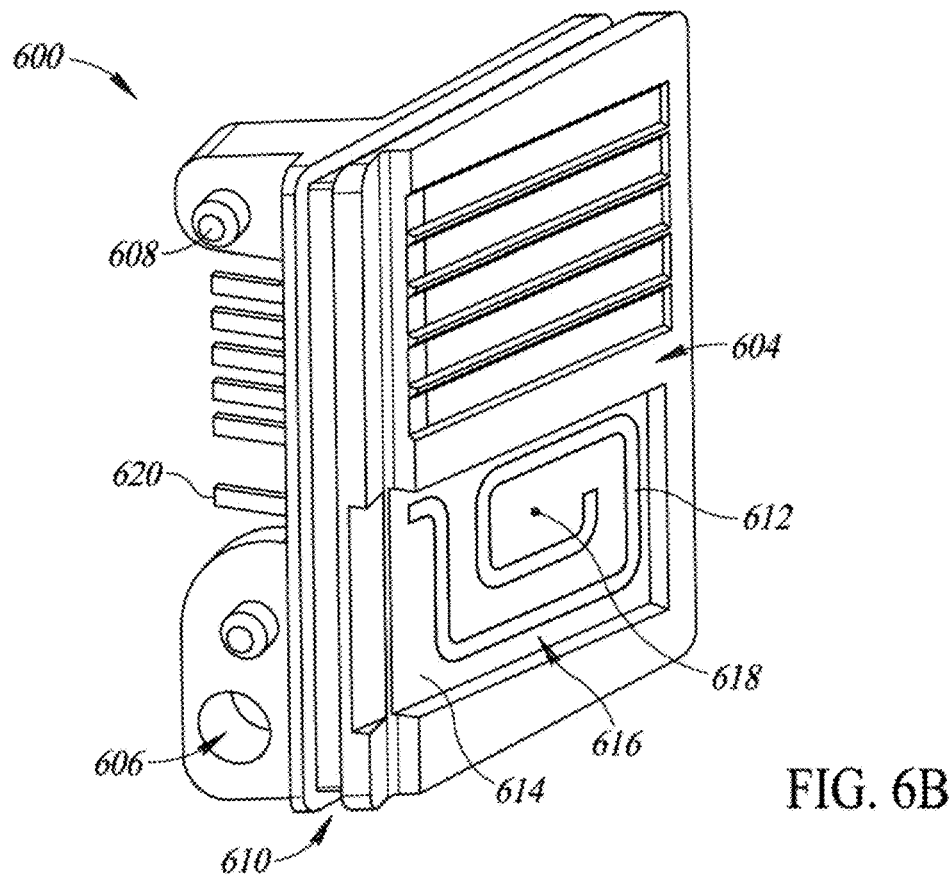
FIG. 6B is a perspective view of a front of the device of FIG. 6A illustrating the antenna carried by one or more layers of a substrate.

FIGS. 6A and 6B are perspective views of an exemplary implementation of a device 600 for carrying an antenna 612. In an implementation, device 600 is positioned and oriented in place of antenna 301 in FIG. 3. The device 600 includes a first surface 602 opposite a second surface 604, as well as an aperture 606 and a pin 608 for coupling the device 600 to a pair of eyeglasses (not shown), such as eyeglasses 100 or 300 in FIG. 1 and FIG. 3, respectively. The aperture 606 receives a second pin (not shown) or other fastening device to secure the device 600 to the eyeglass frames (not shown). Further, the device 600 includes a channel 610 extending around a periphery of the device 600.

In an implementation, the device 600 is located proximate the front end (not shown) of a temple portion (not shown) of an eyeglass frame (not shown), such that the second surface 604 is in the aperture (not shown) of the front end (not shown). As such, the device 600 is preferably located at least partially in the aperture (not shown). In further implementations, dimensions of the second surface 604 are preferably substantially similar (i.e., within 5 millimeters) of dimensions of the aperture (not shown), such that the second surface 604 occupies substantially all of the aperture (not shown). In such an implementation, the channel 610 can receive a gasket, which may assist in preventing water or other debris from entering the temple portion of an eyeglass frame housing electronic components, as described herein. In other implementations, the channel 610 receives a thermally conductive material (which may be the gasket), such that the thermally conductive material transfers heat from the device 600 (and other electronic components proximate the device 600) to the surrounding eyeglass frame. As described herein, a portion of the frame surrounding the device 600 may include metal in order to effectively dissipate heat.

The device 600 further includes the antenna 612, which may be a spiral antenna or a spiral trace, as described herein. The antenna 612 is carried by a printed circuit board 614 housed in the device 600. The printed circuit board 614 includes a major face 616, wherein the antenna 612 is carried by one or more layers of the major face 616. In an implementation, the antenna 612 and printed circuit board 614 are substantially similar in structure and operation to antenna 408a and printed circuit board 400 in FIG. 4, while in other implementations, the antenna 612 and printed circuit board 614 are substantially similar to antennas 508a, 508b, 508c, and 508d and printed circuit board 500 in FIG. 5. As such, the antenna 612 is a directional antenna and the printed circuit board 614 may include more than one layer, wherein each layer is isolated or connected to other layers with vias. As shown in FIG. 6B, the antenna 612 winds about a central point 618, such that a principal axis of a major lobe of the antenna extends perpendicularly outward from the central point 618 and the major face 616 of the printed circuit board 614. Because the device 600 and antenna 612 are located in the aperture (not shown), the principal axis and major lobe of antenna 612 extend perpendicularly outward from the front end of the temple portion of the frame (not shown) when the device 600 is incorporated into a frame (not shown).

The antenna 612 further includes an end 620, which may be coupled to a substrate within the temple portion (not shown), such as a printed circuit board, or a radio, a ground, or other electric components within the temple portion of the frame (not shown). Moreover, the printed circuit board 614 may be thermally conductively coupled to the device 600 with a thermally conductive adhesive or other material with a thermal conductivity in the range of metals. As such, because the device 600 may be thermally conductively coupled to the frame (not shown), the printed circuit board 614 may be considered to be thermally conductively coupled to the frame (not shown), and more specifically, to the front end of an anterior portion of a temple portion of the frame. As described above, the entire temple portion, including the front end and the channel, may comprise various metals, in which case the temple portion dissipates the heat received from the electronic components. Alternatively, although not specifically illustrated, the device 600 may comprise a printed circuit board only that is substantially similar to printed circuit boards 400 or 500 in FIGS. 4 and 5, respectively, in which case, a major face of the device 600 may be directly thermally conductively coupled to the frame, and more specifically, to the front end of the anterior portion of the temple portion of the frame.

Moreover, with reference to FIGS. 1-6B, the design of the antenna 612 and the device 600 enables automated integration of the device 600 into eyeglass frames (not shown). As such a method of assembling eyeglasses 100, 300, includes providing the eyeglass frame 100, 300 with the front end 242 and the first aperture 236 and using an automated system including a pick and place machine that selects device 600 from a container or other storage unit containing a plurality of devices 600, moves the device 600 from the container, and inserts the device into first aperture 236. Preferably, the pick and place machine aligns the device 600 such that the pin 608 and the aperture 606 align with corresponding structures on the eyeglasses 100, 300. Then, the device 600 is secured either via aperture 606, and pin 608, or other fasteners. The securing includes securing the device 600 manually, or automatically with the pick and place machine or a second pick and place machine or other robotic appendage. Once the device 600 is in place in the eyeglasses 100, 300, surface mount technology or other processes can be used to solder the end 620 to a substrate in the eyeglasses 100, 300, or to other electronic components in the eyeglasses 100, 300, such as, for example, the radio 340. One of skill in the art will appreciate that such assembly process utilizing a combination of a pick and place machine, robotic appendages, and surface mount technology, among other devices and processes, enable manufacturing processes that which are tightly controlled and toleranced so as to avoid variability in the manufacturing process. Such manufacturing processes also avoid variability with the directionality of the antenna 612 on the device 600. In other words, because the manufacturing process includes little variation, performance of the directional 612 is consistently in the same direction across a large number of eyeglasses 100, 300 produced according to the present disclosure. Integration and automation of the assembly process may include the technology described in U.S. Provisional Patent Application Ser. No. 62/641,055.

The various implementations described herein provide a compact, aesthetically pleasing glasses form factor that includes an antenna and a radio for enabling inter-device connectivity. Further, such glasses form factor enables efficient and automated manufacturing, as well as a highly directional antenna, in order to increase connectivity range. A location, orientation and position of a power source and an electrically conductive path between the power source and the radio and antenna are adjustable to reduce interference. In addition, the directionality of the antenna reduces interference with metal components which may be proximate to the antenna in the glasses form factor, thereby limiting any interference from such metal components while also enabling efficient heat dissipation from heat produced by the electronic components in the glasses form factor. As a result, implementations of the present disclosure allow for optimization of the connectivity, range, and signal strength of the antenna when transmitting or receiving signals from other electronic devices. In particular, implementations of the present disclosure enable optimal connectivity, range, and signal strength characteristics for the antenna and the radio regardless of the position of an external device within a given range.

Figure 7:
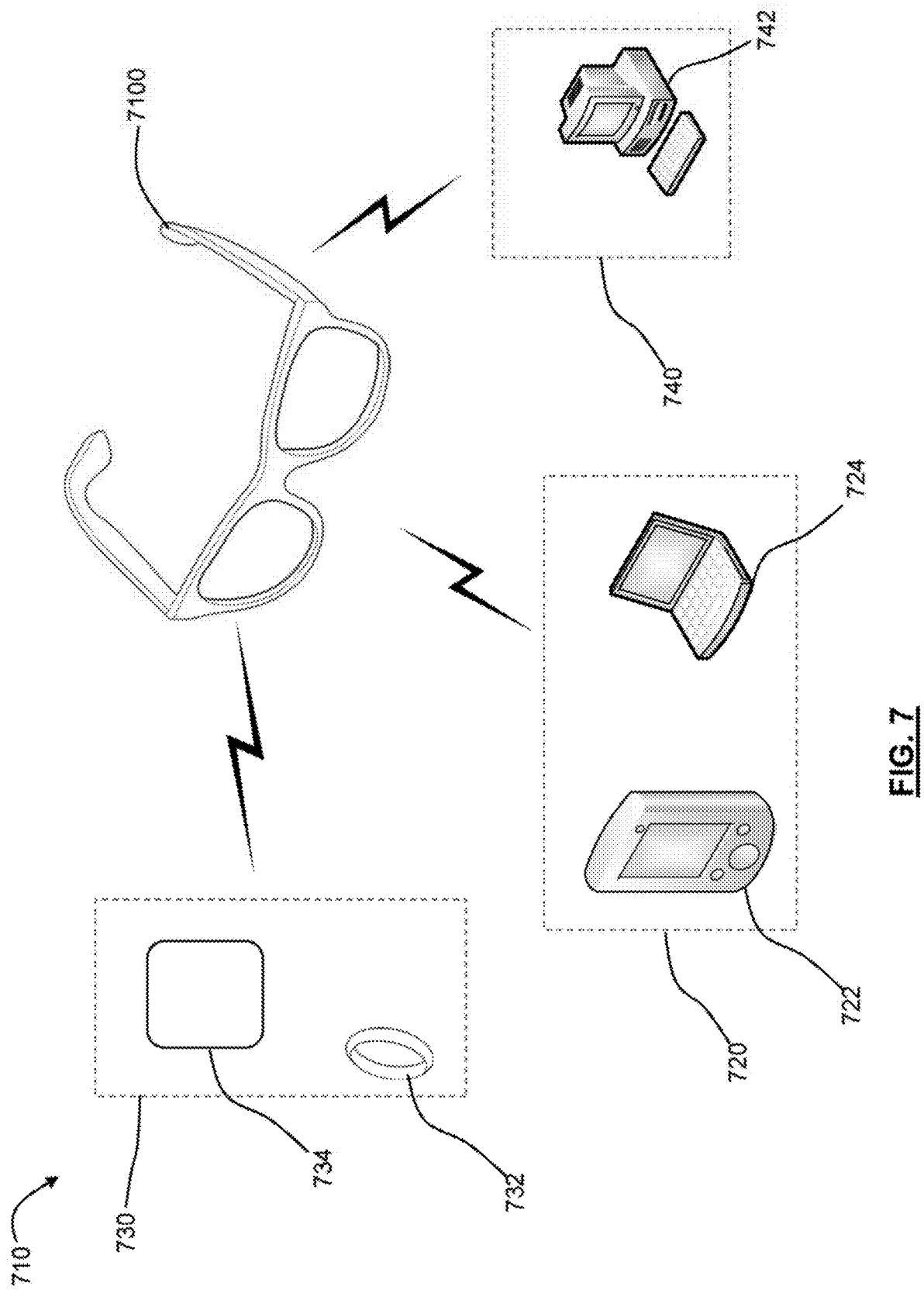
FIG. 7 is a schematic diagram of a system incorporating a wearable heads-up display in communication with at least one other electronic device in accordance with the present systems, devices, and methods.

Turning now to FIG. 7, illustrated therein is a system 710 incorporating a wearable heads-up display ("WHUD") 700 in wireless communication with at least one other electronic device in accordance with the present systems, devices, and methods. In particular, in this implementation the WHUD 7100 may be in wireless communication with one or more portable electronic devices 720, such as a smartphone 722 or a laptop 724. Other exemplary portable electronic devices could include an audio player, a tablet computer, an ebook reader, and so on.

As shown, in this implementation the WHUD 7100 may also be in wireless communication with one or more wearable electronic devices 730, such as an electronic ring 732 or other wearable device 734. Generally, a wearable electronic device may be attached or coupled to the user by a strap or straps, a band or bands, a clip or clips, an adhesive, a pin and clasp, an article of clothing, tension or elastic support, an interference fit, an ergonomic form, etc. Other examples of wearable electronic devices include digital wristwatches, electronic armbands, electronic ankle-bracelets or "anklets", hearing aids, and so on.

As also shown, in this implementation the WHUD 7100 may also be in wireless communication with one or more other electronic devices 740 that are generally considered to be non-portable electronic devices, such as a computer workstation 742. Other examples of such electronic devices could include objects with a large mass or which are generally difficult for a user to hold and carry either due to the size and configuration, or being attached to something, and could include smart televisions, vehicles, smart devices (e.g., appliances such as smart fridges, smart thermostats, or hazardous condition detectors such as smoke alarms), and so on.

Generally speaking, the WHUD 7100 and electronic devices 720, 730, and 740 are in wireless communication to permit the exchange of data therebetween, which could include the exchange of control data, media data, information to be displayed to the user of the WHUD 7100 (i.e., via the display), or other types of data. For instance, the electronic ring 732 could be in wireless communication with the WHUD 7100 to control information being displayed on the transparent combiner of the WHUD 7100. This could allow a user to cycle through a menu of possible commands, for instance, or take some other action.

In some instances, one or more of the electronic devices 720, 730, and 740 could be in wireless communication with each other, regardless of whether they are in communication with the WHUD 7100. For instance, the electronic ring 732 could be in wireless communication with the smartphone 722 to control one or more aspects of the smartphone 722.

Generally speaking, wireless communication within the system 710 can be accomplished using any suitable communication protocol. Some communication protocols may be particularly suitable for use within the system 710, since they may be low power consuming protocols that are well suited for short distance wireless communication. Two examples might include Zigbee and Bluetooth®. For instance, one or more of the electronic devices 720, 730, and 740 and WHUD 7100 may include a Bluetooth® Low Energy chip having a signal frequency of about 2400 MHz to about 2500 MHz.

In some implementations, wireless communication within the system 710 can operate using signals having a frequency in a band of 100 MHz, 200 MHz, 300 MHz, 400 MHz, 800 MHz, and 900 MHz.

One of the challenges with facilitating wireless communication within the system 710 relates to the performance of the various components used to send and receive wireless signals, particularly the antenna.

Generally speaking, an antenna is a function of its environment, and its performance can vary greatly depending on whether the antenna is being used is a laboratory environment with minimal interference, or in the real world in the presence of a user. Quite notably, an antenna tends to be affected by everything around it, including materials and surrounding equipment in an electronic device that includes the antenna, but also aspects of the surrounding environment, including the presence of the user. Specifically, the radiated electromagnetic (EM) fields from an antenna interact with nearby materials, which can alter the frequency of operation of the antenna or change its input impedance. This, in turn, can induce a mismatch with the driving power amplifier (e.g., transmitter) or receiving low noise amplifier (e.g., receiver). As a result, to develop reliable antenna performance, the antenna should be tested in its final environment (or a reasonable approximation thereof) and impedance matched so that it operates well within the desired frequency band. A poorly matched antenna on the other hand can degrade the system link budget by 10-30 dB thus severely reducing the overall link range.

For the system 710 described above, it is generally desirable to understand the various use cases around how a user will be interacting with the WHUD 7100 and the other electronic devices 720, 730, and 740. For example, some wearable components such as the electronic ring 732 may be worn by the user of the WHUD 7100 at times, while others such as a smartphone 722 may typically be carried in a pocket. Similarly, the communication distance between a user of the WHUD 7100 and the electronic devices 720, 730, and 740 can vary. In some cases, it may be sufficient to have a working communication range of approximately 10 meters or less to facilitate effective wireless communication between the WHUD 7100 and one or more electronic devices 720, 730, and 740. In some implementations it may be desirable to have a higher working range greater than 10 meters, greater than 20 meters, or even larger. In some cases, it may be suitable to have a smaller working range, such as less than 5 meters, less than 3 meters, and so on. In some cases the effective working communication range can be varied by adjusting the power of the communications modules within the system 710.

Figure 8:
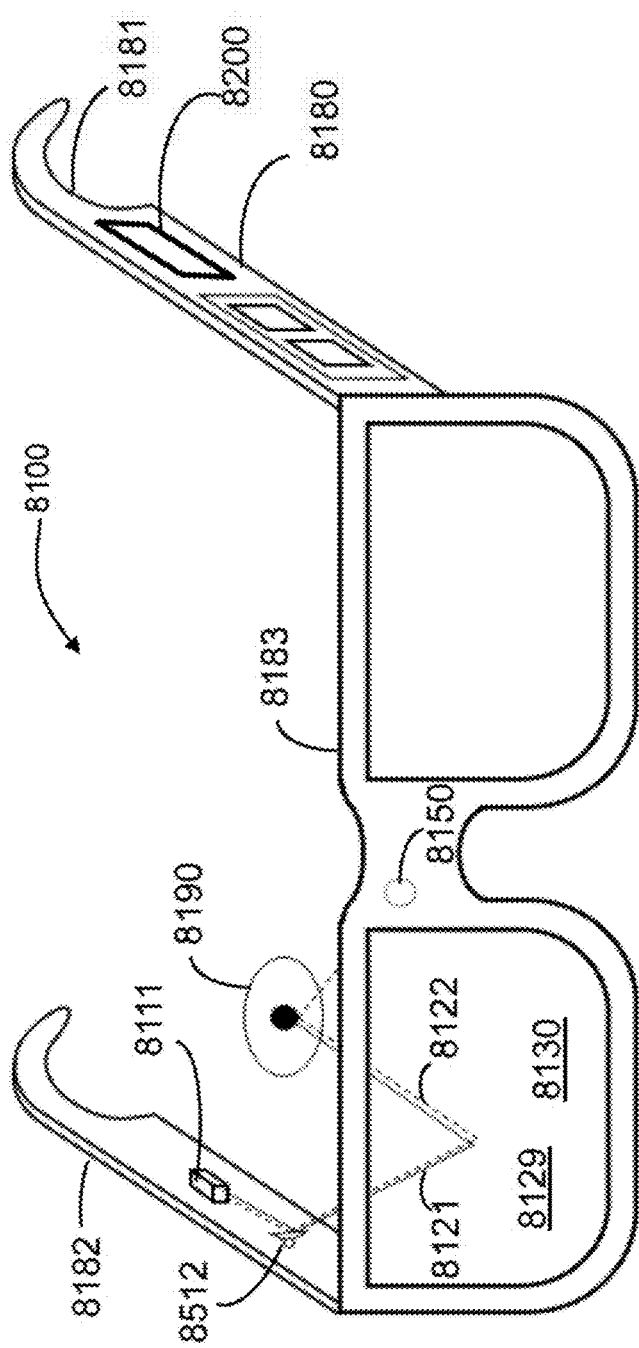
FIG. 8 is a schematic diagram of a wearable heads-up display in accordance with the present systems, devices, and methods.

Turning now to FIG. 8, illustrated therein is a perspective view of an exemplary WHUD 8100 operable for wireless communication with electronic devices, such as electronic devices 720, 730 and 740. WHUD 8100 as shown includes elements such as a projector 8111 (i.e., a laser module) adapted to output a visible laser light 8121 (e.g., in at least a first narrow waveband) to a scan mirror 8512. In some cases, the projector 8111 may be operable to output infrared laser light 8122. The WHUD 8100 also includes a display component that enables the user to see displayed content but also does not prevent the user from being able to see their external environment. As shown, the display component could include a transparent combiner 8130 (aligned with an eyeglass lens 8129) which redirects the laser light 8121 and 8122 towards an eye 8190 of a user. In some implementations, the WHUD 8100 may include at least one infrared photodetector 8150 responsive to infrared laser light 8122.

Depending on the implementation, the visible laser light 8121 may correspond to any of, either alone or in any combination, red laser light, a green laser light, and/or a blue laser light.

WHUD 8100 also includes a support frame 8180 that has a general shape and appearance or a pair of eyeglasses, so that transparent combiner 8130 is positioned within a field of view of an eye 8190 of the user when support frame 8180 is worn on a head of the user. The support frame 8180 typically includes two support arms 8181, 8182 extending rearwardly from a front rim portion 8183 that supports the eyeglass lens 8129 and transparent combiner 8130. The rim portion 8183 is normally supported by a nose of the user, while the support arms 8181, 8182 are normally supported by the ears of the user.

WHUD 8100 further includes a digital processor 8160 communicatively coupled to photodetector 8150 (in this example), and a non-transitory processor-readable storage medium or memory 8170 communicatively coupled to digital processor 8160. Memory 8170 stores processor-executable instructions and/or data that, when executed by processor 8160, can cause processor 8160 to take actions, such as determining one or more position(s) and/or movement(s) of eye 8190, determining what information to display on the transparent combiner 8130, and managing communication between the WHUD 8100 and one or more electronic devices 720, 730 and 740.

In particular, WHUD 8100 further includes a communication module 8200 for wireless communication with other electronic devices, and which may be communicatively coupled to the digital processor. Generally speaking, according to the teachings herein, one or more components of the communication module 8200 may be integrated within one or more components of the support frame 8180. For instance, the communication module 8200 may be at least partially integrated within one or both of the support arms 8181, 8182. The communication module 8200 may be at least partially integrated within the rim portion 8183 of the support frame 8180. In some examples, the communication module 8200 may be at least partially integrated within some combination of the support arms 8181, 8182 and the rim portion 8183.

Figure 9B:
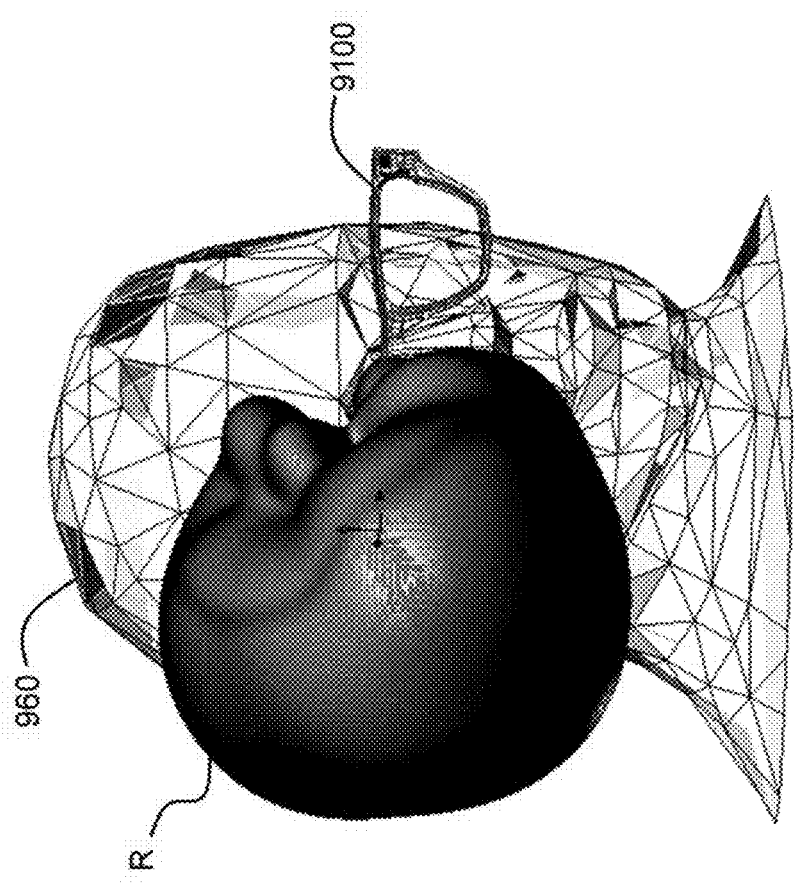
FIG. 9B is a schematic representation of the wearable heads-up display of FIG. 9A showing an exemplary EM pattern generated by an antenna in the wearable heads-up display.
Figure 9A:
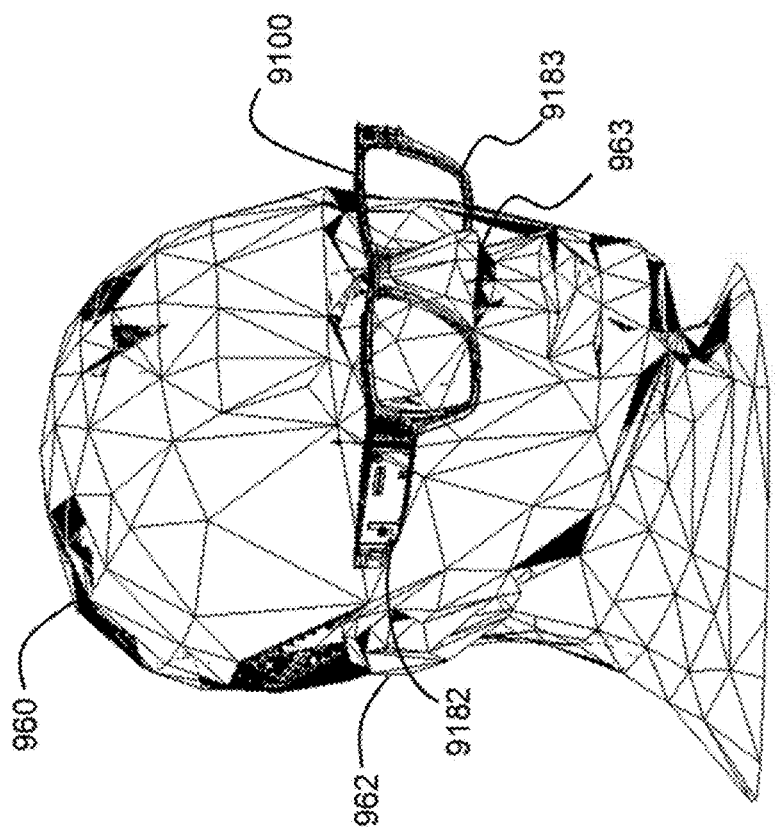
FIG. 9A is a schematic representation of a wearable heads-up display worn on a head of a user.

Generally speaking, the communication module 8200 includes a radio frequency (RF) antenna for the signals transmitted and received via the communication network. For example, FIG. 9A shows the WHUD 9100 mounted on a head 960 of a user, with the support arm 9182 being supported by an ear 962 and the rim portion 9183 being supporting by a nose 963. FIG. 9B on the other hand shows an exemplary EM pattern "R" generated by an antenna in the WHUD 9100.

Figure 10:
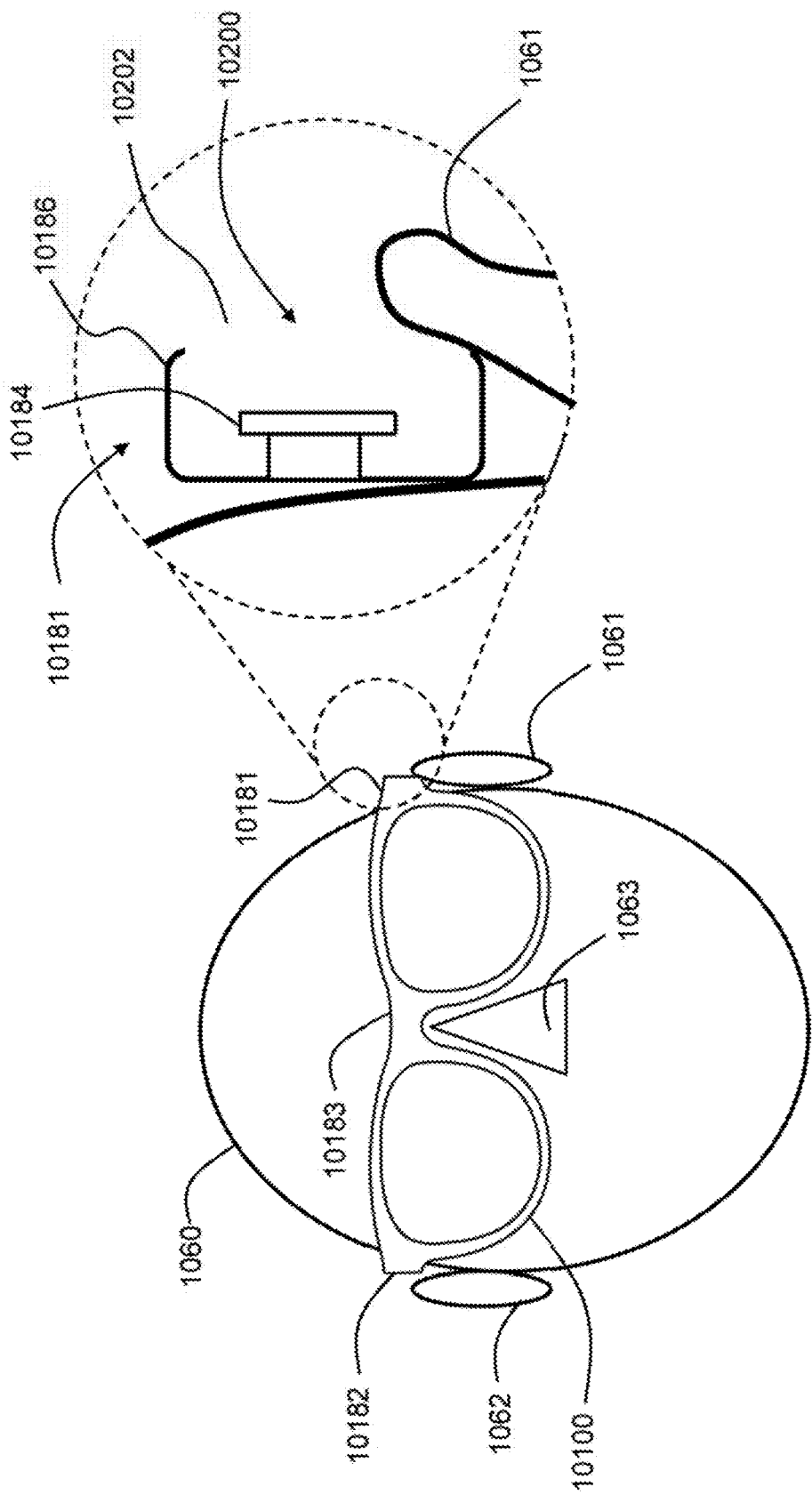
FIG. 10 is a schematic diagram of a communication module integrated within a support arm of a wearable heads-up display according to the present systems, devices, and methods.

Turning now to FIG. 10, the WHUD 10100 mounted on the user's head 1060 is shown schematically in greater detail. As shown, the WHUD 10100 is mounted on the head 1060, with the arm supports 10181, 10182 being supported by ears 1061, 1062 (respectively) and the rim portion 10183 being supported by nose 1063.

Shown zoomed in is a schematic cross-section of the arm portion 10181 having an integrated communication module 10200 therein. In particular the arm support 10181 generally includes a first body member 10186 that typically extends lengthwise of the arm support 10181, and which serves as a housing for components of the WHUD 10100, such as a printed circuit board (PCB) 10184, which may include the digital processor 10160, memory 10170, and so on. The first body member 10186 may be made of any suitable material, such as a plastic or a metal.

The arm support 10181 also includes a second body member 10202 which is designed to serve as a resonating element or antenna of the communication module 10200. As shown schematically, the second body member 10202 may be electrically and/or mechanically isolated from the first body member 10185. The second body member 10202 may in some implementations comprise a conductive material, such as a metal plate element that resonates in response to instructions received from the digital processor 10160 to send wireless signals to one or more electronic devices 720, 730 and 740. Moreover, the second body member 10202 may also resonate in response to signals received from the electronic devices 720, 730, and 740 to act as a receiving antenna.

Figure 11:
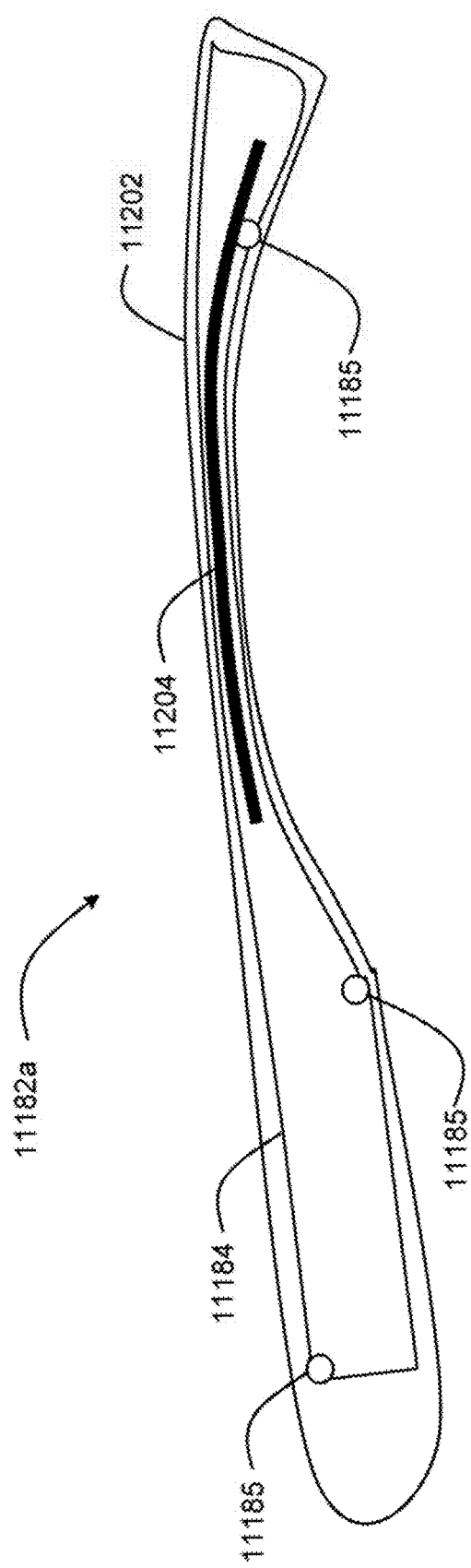
FIG. 11 is a schematic diagram of a communication module having an antenna integrated within a support arm of a wearable heads-up display according to the present systems, devices, and methods.

Turning now to FIG. 11, illustrated therein is an example of an arm support 11182*a* having integrated components of the communication module. In particular arm support 11182*a* includes PCB 11184 which is mounted to the first body member (not shown in FIG. 11), such as via mounting screws 11185. In this implementation, the communication module includes a wire antenna 11204 which is housed within the arm support 11182*a*. In some implementations, the wire antenna 11204 may be coupled to the second body member 11202 to cooperate therewith as an antenna for the WHUD.

Figure 12:
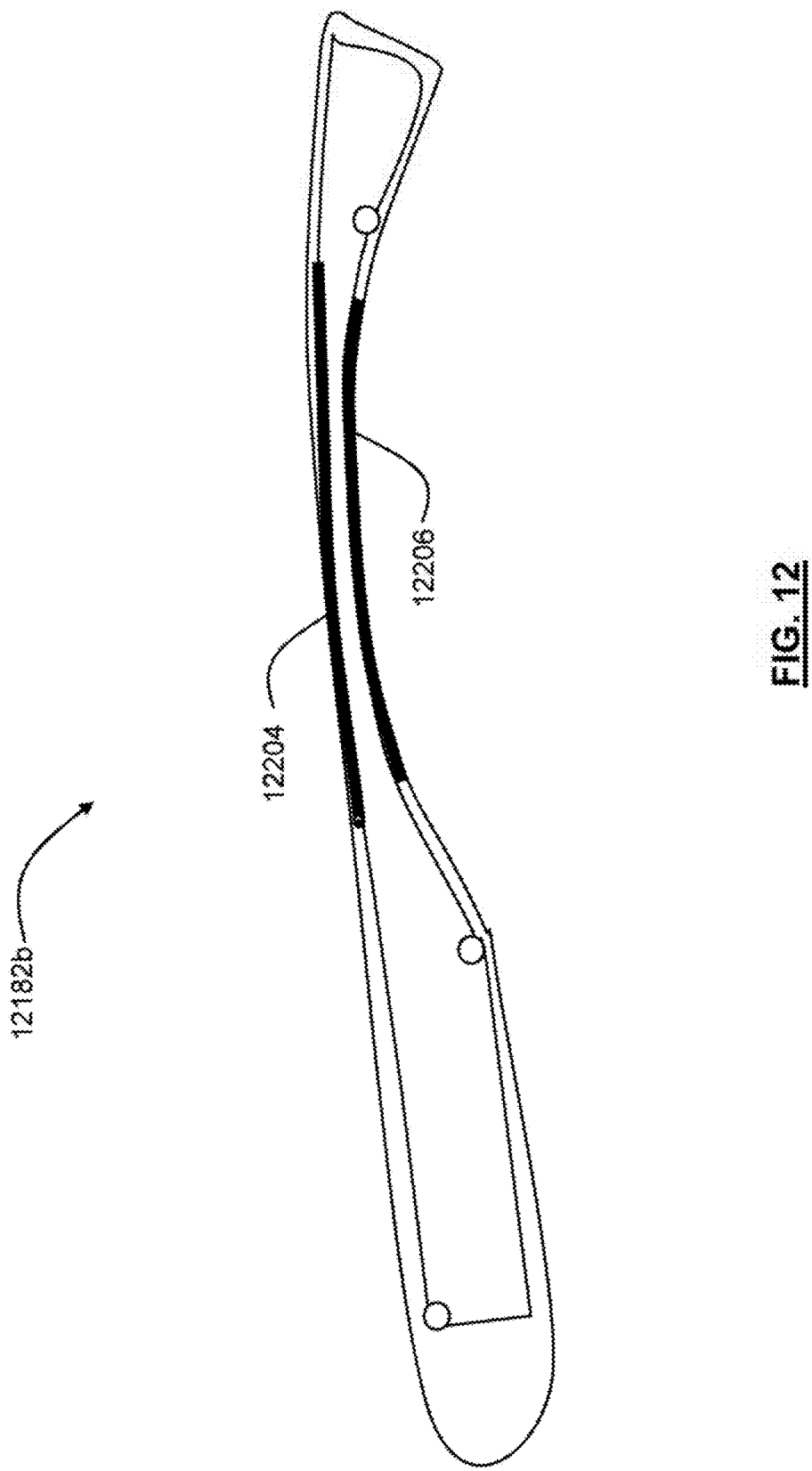
FIG. 12 is a schematic diagram of a communication module having an antenna integrated within a support arm of a wearable heads-up display according to the present systems, devices, and methods.

Turning now to FIG. 12, illustrated therein is an example of another arm support 12182*b* having integrated components of the communication module. In this implementation, the arm support 12182*b* includes the wire antenna 12204 as well as a grounding element 12206 for increasing the ground plane.

Figure 13:
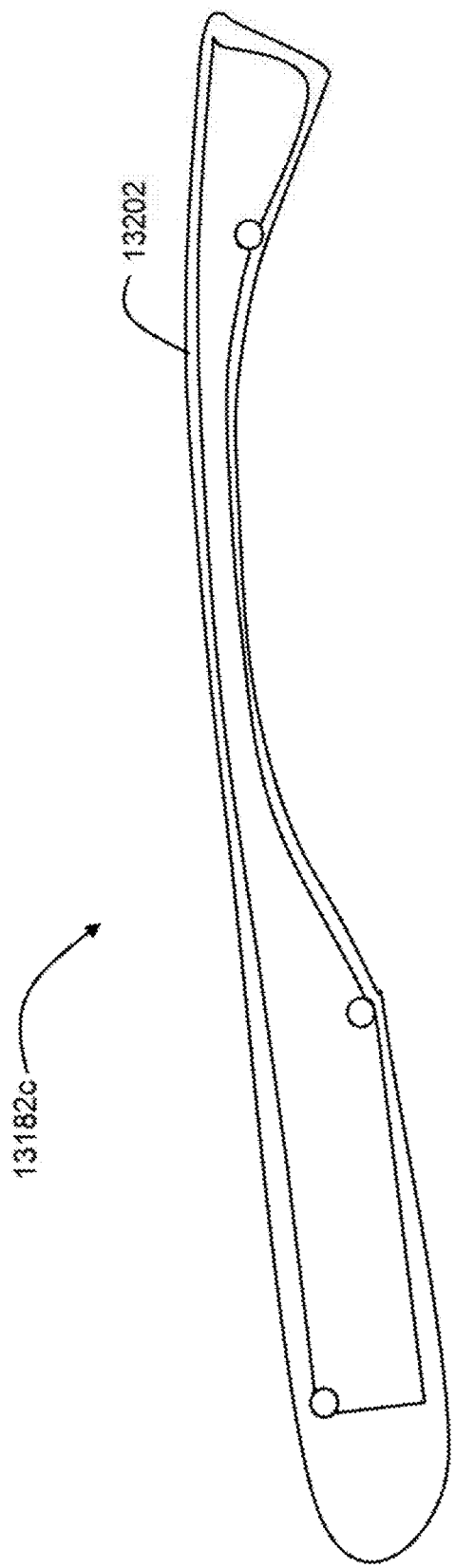
FIG. 13 is a schematic diagram of a communication module having an antenna integrated within a support arm of a wearable heads-up display according to the present systems, devices, and methods.

Turning now to FIG. 13, illustrated therein is an example of another arm support 13182*c* having integrated components of the communication module. In this implementation, the second body portion 13202 serves as the antenna for the communication module without requiring an internal wire antenna.

Since the antenna will be worn but a user, it will be in close proximity to the user's body. By being in close proximity to the user's body, the user's body can affect the input impedance. In some cases, the length of the antenna can be designed to minimize this input impedance. In particular, the length of the antenna can be designed to consider impedance matching. Generally, an ideal length of the antenna is $n\lambda/2$, wherein $\lambda$ is the wavelength of a signal guided.

In addition to selecting an appropriate length for the antenna, matching will also be provided by an impedance matching module on the PCB.

One of the challenges observed, however, with some of the preceding implementations relates to the nature of antennae. In particular, as discussed above an antenna is a function of its environment, and its performance can vary greatly depending on the operating environment. In designing a WHUD, however, it can be difficult to develop a comfortable "one size fits all" arrangement where the size and shape of all the components, particularly the arm supports, is constant. In fact, in contrast, it has been observed that it may be desirable to offer WHUDs in multiple shapes and sizes to accommodate different sizes and shapes of the heads of different users.

Returning to FIG. 10, this means that the respective lengths of the arm portions 10181, 10182 is sometimes different, in some case quite different. As a result, this can have a dramatic impact on the performance of the antenna. Although it may be possible to have a second body portion 10202 that is the same for each of the different sizes of arm portions 10181, 10182, this can lead to aesthetic challenges as differently sized WHUDs 10100 may have a vastly different appearance.

According to another implementation of the teachings herein, one or more of the arm supports 10181, 10182 may incorporate a multi-piece construction, wherein the antenna elements of the communication module 10200 are incorporated in first piece that has a common size and shape, and the other portion of the arm supports 10181, 10182 can vary in length.

Figure 14:
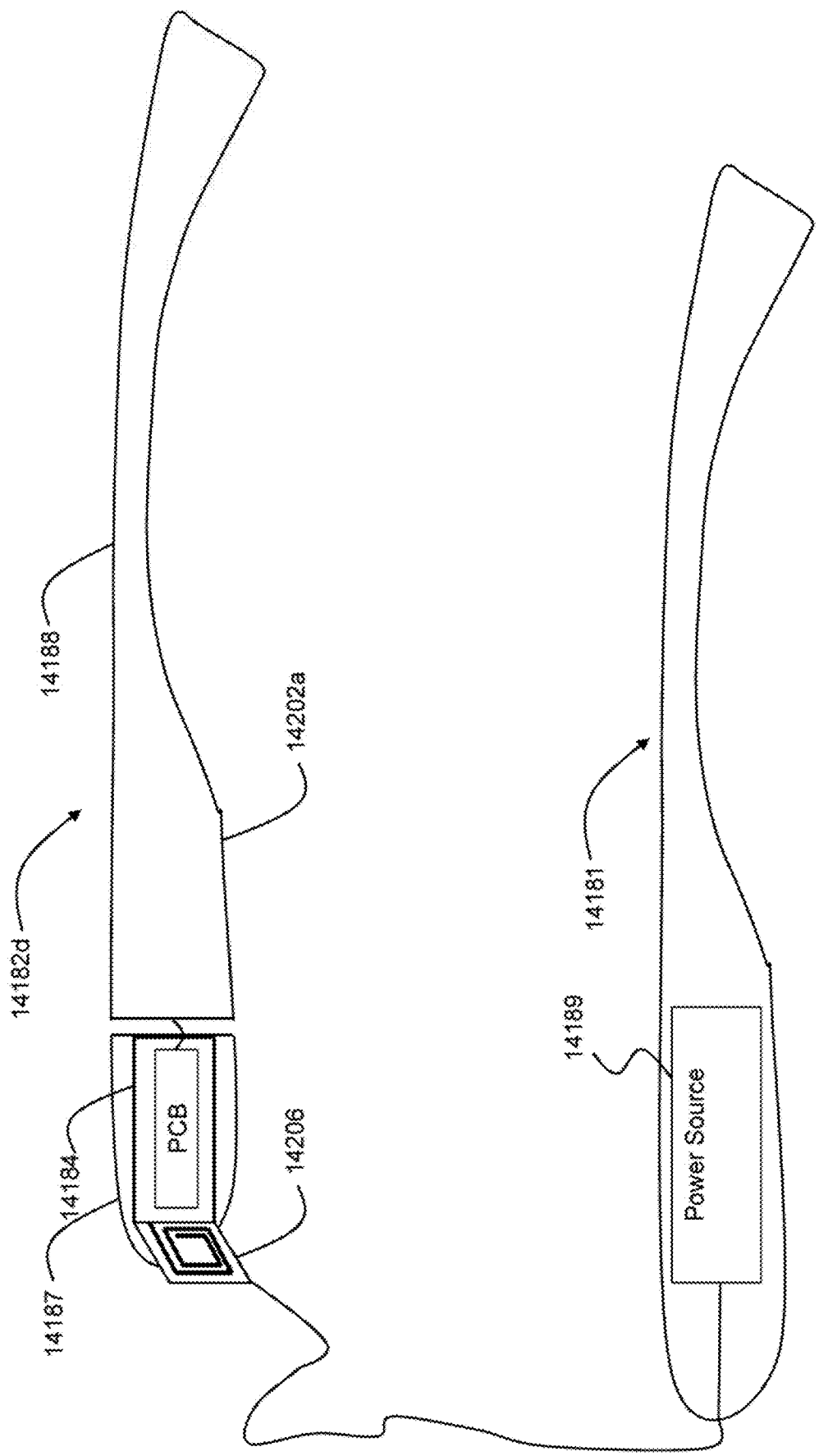
FIG. 14 is a schematic diagram of a communication module having an antenna integrated within a rim portion of a wearable heads-up display according to the present systems, devices, and methods.

One example of such an embodiment is shown schematically in FIG. 14. In this example, the arm support 14182*d* includes a first forward portion 14187, and a second rearward portion 14188. The forward portion 14187 may be positioned adjacent (or even be part of) the rim support, and may include the PCB 14184. As shown, the forward portion 14187 includes an antenna 14206 (shown here as a spiral antenna). The forward portion 14187 can generally have a consistent shape and size, regardless of the sizing required to accommodate a particular head of a user.

The rearward portion 14188 of the arm support 14182*d*, on the other hand, can have a size and shape that is selected to accommodate the sizing requirements for the user's head. For instance, in larger WHUDs, the rearward portion 14188 could be longer, while in smaller WHUDs the rearward portion 14188 could be smaller.

In some implementations, the rearward portion 14188 could include a body member 14202*a* (i.e., a metal plate), which could be used to extend the ground plane.

As shown in FIG. 14, in this implementation the other arm support 14181 could support a power source 14189 (i.e., a battery) which provides power to the components in the arm support 14182*d*.

Figure 15:
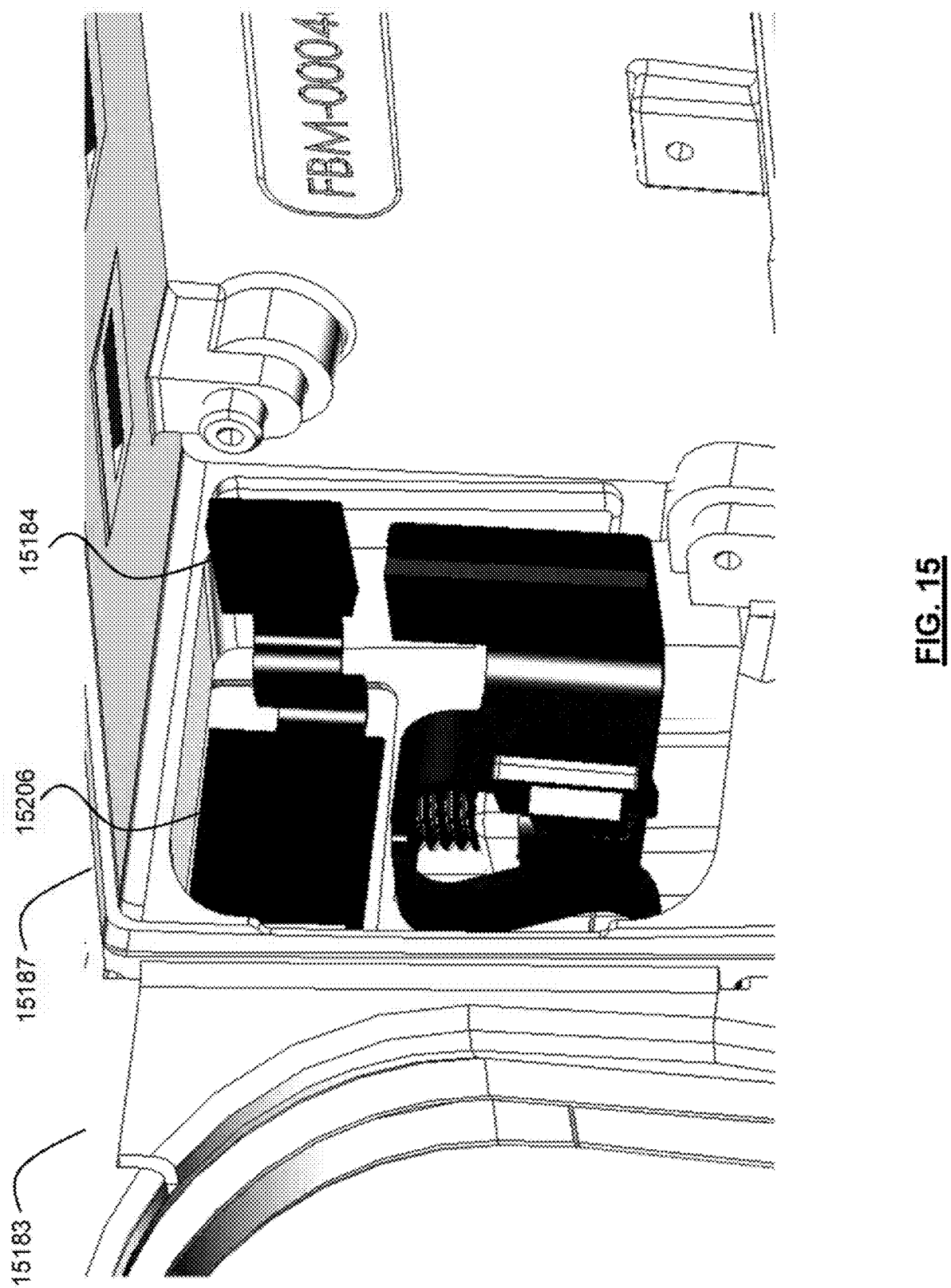
FIG. 15 is a schematic diagram of a communication module having an antenna integrated within a rim portion of a wearable heads-up display according to the present systems, devices, and methods.

Turning now to FIG. 15, illustrated therein is a close up view of an exemplary implementation, wherein the forward portion 15187 may be part of or coupled to the rim support 15183. In this implementation, the antenna 15206 is located in the front area of the forward portion, and is coupled to the PCB 15184 via a flex connector.

Throughout this specification and the appended claims, the term "about" is sometimes used in relation to specific values or quantities. For example, "light within a bandwidth of about 10 nm or less." Unless the specific context requires otherwise, the term about generally means±15%.

The above description of illustrated implementations and embodiments, including what is described in the Abstract, is not intended to be exhaustive or to limit the implementations or embodiments to the precise forms disclosed. Although specific implementations or embodiments of and examples are described herein for illustrative purposes, various equivalent modifications can be made without departing from the spirit and scope of the disclosure, as will be recognized by those skilled in the relevant art. The teachings provided herein of the various implementations or embodiments can be applied to other portable electronic devices, and not necessarily the exemplary eyeglass frames or wearable heads-up displays generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations or embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various implementations or embodiments described above can be combined to provide further implementations or embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to U.S. Provisional Patent Application Ser. No. 62/670,200, U.S. Provisional Patent Application Ser. No. 62/236,060, U.S. Non-Provisional patent application Ser. No. 15/282,535 (now US Patent Application Publication 2017/0097753), U.S. Non-Provisional patent application Ser. No. 15/799,642 (now US Patent Application Publication 2018/0067621), U.S. Provisional Patent Application Ser. No. 62/609,607, and U.S. Provisional Patent Application Ser. No. 62/634,654 are incorporated herein by reference, in their entirety.

Aspects of the implementations or embodiments can be modified, if necessary, to employ systems, circuits and concepts of the various patents, applications and publications to provide yet further embodiments.

These and other changes can be made to the implementations or embodiments in light of the above-detailed description. In general, in the following claims, the terms used should not be construed to limit the claims to the specific embodiments disclosed in the specification and the claims, but should be construed to include all possible implementations or embodiments along with the full scope of equivalents to which such claims are entitled. Accordingly, the claims are not limited by the disclosure.

The invention claimed is:

1. An apparatus, comprising:
    a front eyeglass frame, including: a first rim, a second rim, and a bridge that physically couples the first rim and the second rim;
    a first arm coupled to the first rim and having a first temple portion;
    a second arm coupled to the second rim and having a second temple portion;
    a printed circuit board; and
    a directional antenna carried by the printed circuit board, the directional antenna having a main lobe with a principal axis that extends outwardly from the printed circuit board, the printed circuit board and the directional antenna housed in the first temple portion of the first arm with the principal axis of the directional antenna directed outwardly therefrom.

2. The apparatus of claim 1 wherein the directional antenna is a spiral antenna.

3. The apparatus of claim 1 wherein the directional antenna comprises a spiral trace of an electrically conductive material carried by one surface of the printed circuit board.

4. The apparatus of claim 1 wherein the directional antenna comprises a spiral trace of an electrically conductive material carried along two or more layers of the printed circuit board.

5. The apparatus of claim 1 wherein the principal axis of the directional antenna extends outwardly from a front of the first temple portion into a field-of-vision defined by the front eyeglass frame.

6. The apparatus of claim 1 wherein the printed circuit board has a major face, and the directional antenna is planar with the major face of the printed circuit board and the principal axis of the directional antenna extends perpendicularly with respect to the major face of the printed circuit board.

7. The apparatus of claim 6 wherein the printed circuit board is oriented in the first temple portion with the principal axis of the directional antenna extending perpendicularly from a front end of the first temple portion.

8. The apparatus of claim 6 wherein the first temple portion is a metal channel member.

9. The apparatus of claim 8 wherein the principal axis of the directional antenna extends outwardly from a front end of the first temple portion, the front end of the first temple portion at least proximate a portion of the front eyeglass frame.

10. The apparatus of claim 9 wherein the metal channel member has a U-shaped metal cross section and a non-metallic front end, and the principal axis of the directional antenna extends outwardly from the front end of the first temple portion.

11. The apparatus of claim 8 wherein a portion of the printed circuit board is thermally conductively coupled to the first temple portion.

12. The apparatus of claim 8, further comprising:
    a thermally conductive adhesive that secures a major surface of the printed circuit board thermally conductively to the metal channel member.

13. The apparatus of claim 1, further comprising:
    a radio housed in the first temple portion of the first arm and electrically coupled to the directional antenna.

14. The apparatus of claim 13, further comprising:
    circuitry communicatively coupleable to a power source housed in the second temple portion of the second arm and in electrical communication with the radio by an electrically conductive path passing through the first rim, the second rim, and the bridge.

15. The apparatus of claim 14 wherein the electrically conductive path passes internally through the first rim, the second rim, and the bridge.

16. The apparatus of claim 13, further comprising:
    circuitry communicatively coupleable to a power source housed in the first temple portion of the first arm and in electrical communication with the radio by an electrically conductive path passing through a portion of the first temple portion of the first arm.

17. The apparatus of claim 1, further comprising:
    a first lens mounted in the first rim; and
    a second lens mounted in the second rim.

18. The apparatus of claim 1 wherein the first temple portion of the first arm includes a first hinge and the second temple portion of the second arm includes a second hinge.

* * * * *